United States Patent
Ibrahim et al.

(10) Patent No.: US 12,232,156 B2
(45) Date of Patent: Feb. 18, 2025

(54) TECHNIQUES FOR SUPPLEMENTARY SIDELINK RESOURCE CONFIGURATION IN FULL DUPLEX MODE

(71) Applicant: QUALCOMM Incorporated, San Diego, CA (US)

(72) Inventors: Abdelrahman Mohamed Ahmed Mohamed Ibrahim, San Diego, CA (US); Muhammad Sayed Khairy Abdelghaffar, San Jose, CA (US); Seyedkianoush Hosseini, San Diego, CA (US); Ahmed Attia Abotabl, San Diego, CA (US); Wei Yang, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 539 days.

(21) Appl. No.: 17/392,162

(22) Filed: Aug. 2, 2021

(65) Prior Publication Data
US 2023/0030144 A1  Feb. 2, 2023

(51) Int. Cl.
*H04W 72/541* (2023.01)
*H04W 72/20* (2023.01)

(52) U.S. Cl.
CPC ......... *H04W 72/541* (2023.01); *H04W 72/20* (2023.01)

(58) Field of Classification Search
CPC ...... H04L 5/006; H04L 5/0094; H04W 72/20; H04W 72/40
See application file for complete search history.

(56) References Cited

U.S. PATENT DOCUMENTS

2021/0045093 A1* 2/2021 Rao ........................ H04W 72/04
2022/0132575 A1* 4/2022 Wu .................... H04W 74/0825

FOREIGN PATENT DOCUMENTS

EP  3547778 A1  10/2019
WO  2019160788 A1  8/2019

OTHER PUBLICATIONS

International Search Report and Written Opinion—PCT/US2022/073539—ISA/EPO—Oct. 26, 2022.
LG Electronics Inc, "NR Sidelink Design Based on LTE Sidelink", 3GPP TSG-RAN WG2 #103bis, R2-1815441, 3rd Generation Partnership Project (3GPP), Mobile Competence Centre, 650, Route Des Lucioles, F-06921 Sophia-Antipolis Cedex, France, Sep. 28, 2018, pp. 1-5, XP051524783, p. 3-p. 5.

* cited by examiner

*Primary Examiner* — Zhensheng Zhang
(74) *Attorney, Agent, or Firm* — Arent Fox LLP

(57) ABSTRACT

Techniques for supplementary sidelink resource configuration in full duplex mode may include a first user equipment (UE) transmitting to a base station an interference report indicating sidelink communication interference. The base station may select a resource pool according to the interference report, where the resource pool includes supplementary sidelink subchannels reserved for receiving sidelink communications and conditionally reserved for transmitting sidelink communications based on the interference report. The base station may transmit, to the first UE or a second UE causing the sidelink communication interference, configuration information indicating the resource pool. Based on the configuration information, the first UE and/or the second UE may perform sidelink communications (with each other or with other UEs) using the supplementary sidelink sub channels.

30 Claims, 18 Drawing Sheets

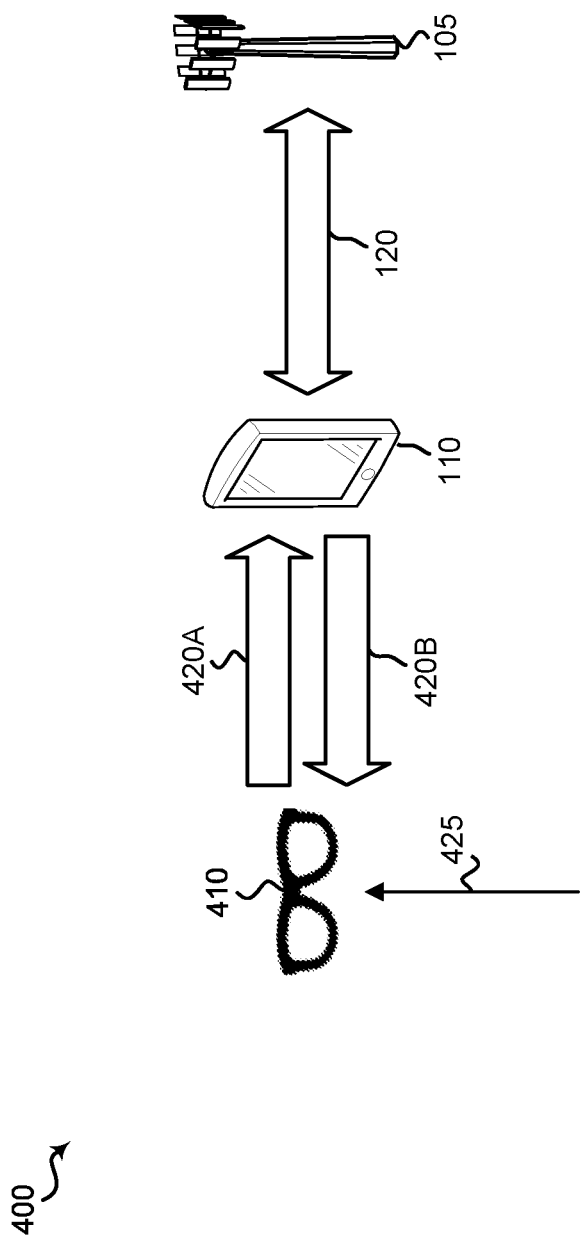

```
SL-ResourcePool-r16 ::=        Sequence {
    sl-PSCCH-Config-r16             SetupRelease { sl-PSCCH-Config-r16 }                          OPTIONAL,   -- Need M
    sl-PSSCH-Config-r16             SetupRelease { sl-PSSCH-Config-r16 }                          OPTIONAL,   -- Need M
    sl-PSFCH-Config-r16             SetupRelease { sl-PSFCH-Config-r16 }                          OPTIONAL,   -- Need M
    sl-SyncAllowed-r16              sl-SyncAllowed-r16                                            OPTIONAL,   -- Need M
810 sl-SubchannelSize-r16           ENUMERATED {n10, n15, n20, n25, n50, n75, n100} OPTIONAL,   -- Need M
    sl-Period-r16                   ENUMERATED {ffs}                                              OPTIONAL,   -- Need M
    sl-TimeResource-16              ENUMERATED {ffs}                                              OPTIONAL,   -- Need M
820 sl-StartRB-Subchannel-r16       INTEGER {0..265}                                              OPTIONAL,   -- Need M
    sl-NumSubchannel-r16            INTEGER {1..27}                                               OPTIONAL,   -- Need M
    sl-MCS-Table-r16                ENUMERATED {qam64, qam256, qam64LowSE}                        OPTIONAL,   -- Need M
    sl-ThreshS-RSSI-CBR-r16         INTEGER {0..45}                                               OPTIONAL,   -- Need M
    sl-TimeWindowSizeCBR-r16        ENUMERATED {ms100, slot100}                                   OPTIONAL,   -- Need M
    sl-TimeWindowSizeCR-r16         ENUMERATED {ms1000, slot1000}                                 OPTIONAL,   -- Need M
    sl-PTRS-Config-r16              sl-PTRS-Config-r16                                            OPTIONAL,   -- Need M
    sl-ConfiguredGrantConfigList-r16   sl-ConfiguredGrantConfigList-r16                           OPTIONAL,   -- Need M
    sl-UE-SelectectConfigRP-r16     sl-UE-SelectectConfigRP-r16                                   OPTIONAL,   -- Need M
    sl-RxParametersNcell-r16        SEQUENCE {
        sl-TDD-Config-r16               TDD-UL-DL-ConfigCommon                                    OPTIONAL,
        sl-SyncConfigIndex-r16          INTEGEGER {0..15}
    }
    sl-ZoneConfigMCR-List-r16       SEQUENCE {SIZE (16)} OF sl-ZoneConfigMCR-r16 OPTIONAL         -- Need M
    ...
}
```

*FIG. 8*

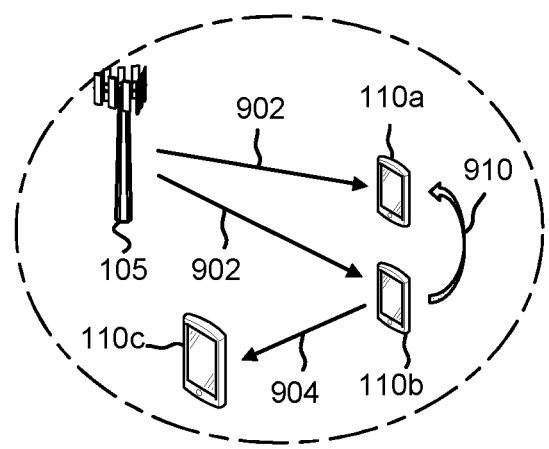
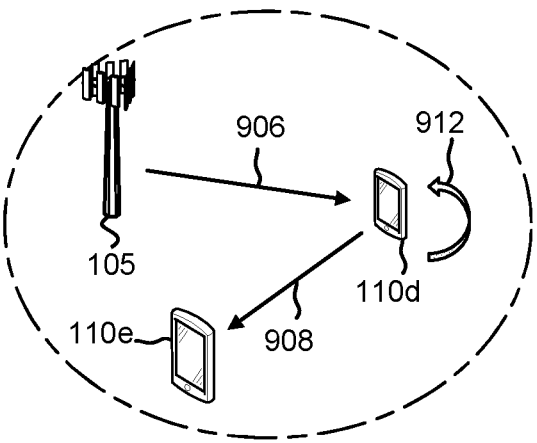
FIG. 9A  FIG. 9B
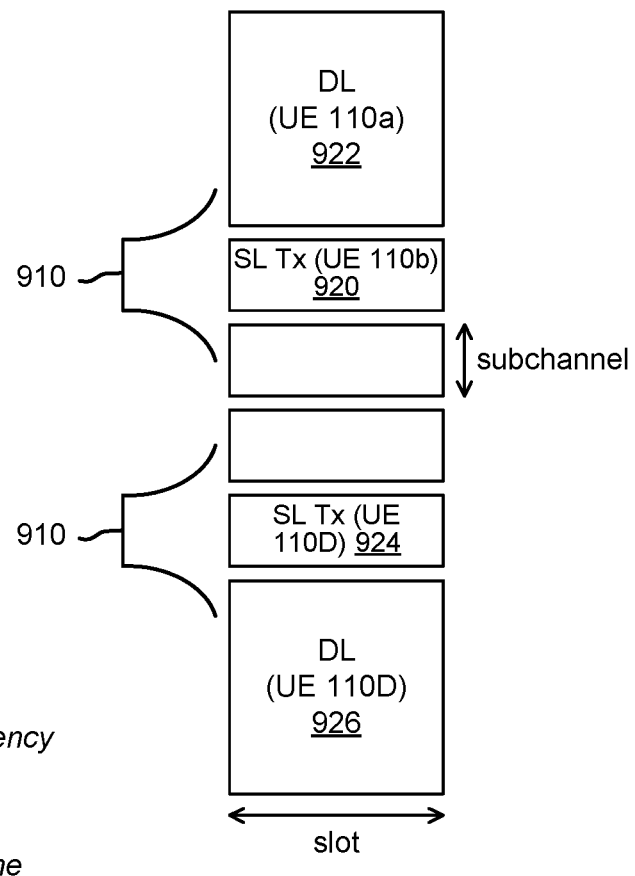
FIG. 9C

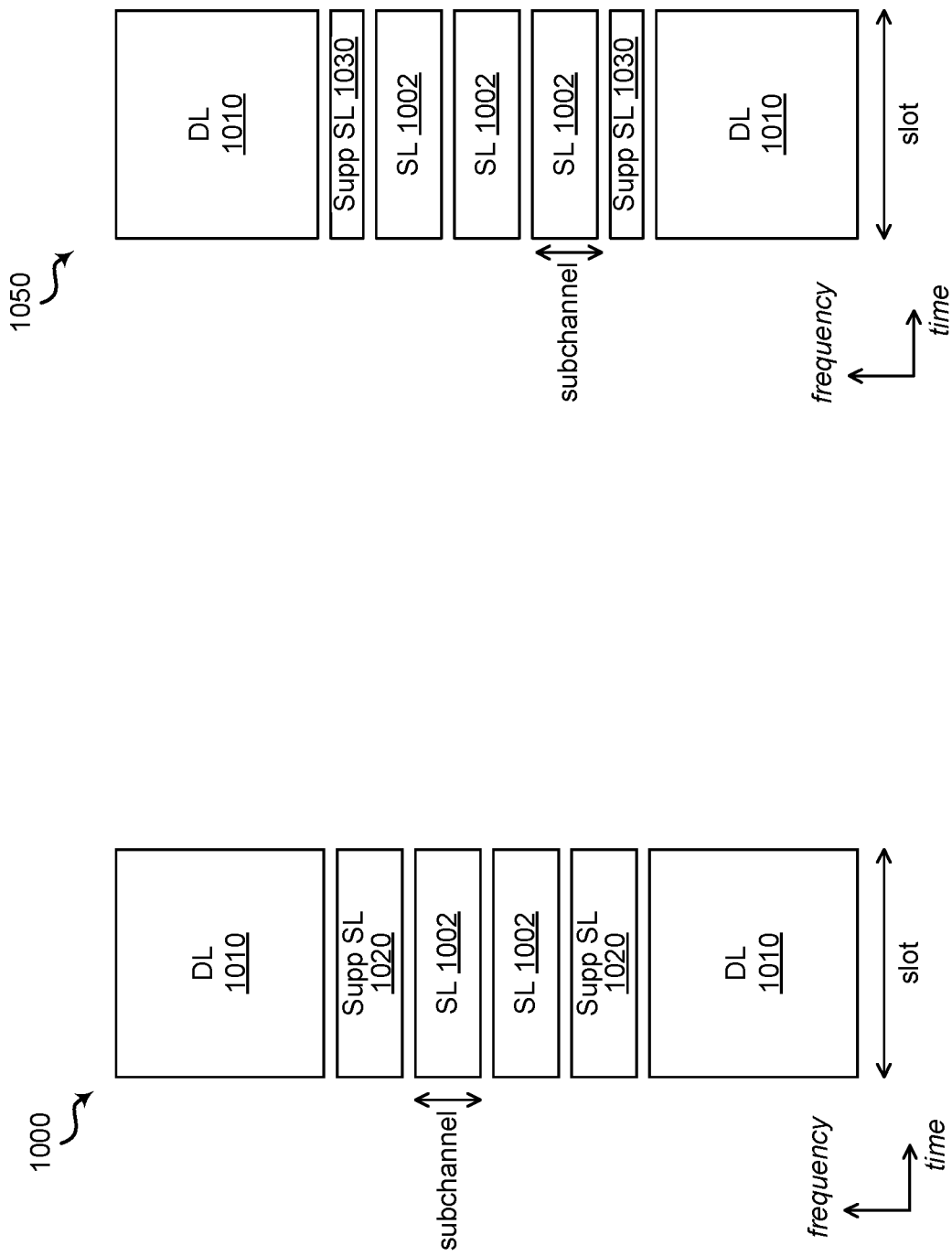

TECHNIQUES FOR SUPPLEMENTARY SIDELINK RESOURCE CONFIGURATION IN FULL DUPLEX MODE

TECHNICAL FIELD

Aspects of the present disclosure relate generally to wireless communications, and more particularly, to techniques for supplementary sidelink resource configuration in full duplex mode.

BACKGROUND

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which may be referred to as new radio (NR)) is envisaged to expand and support diverse usage scenarios and applications with respect to current mobile network generations. In an aspect, 5G communications technology may include: enhanced mobile broadband addressing human-centric use cases for access to multimedia content, services and data; ultra-reliable-low latency communications (URLLC) with certain specifications for latency and reliability; and massive machine type communications, which may allow a very large number of connected devices and transmission of a relatively low volume of non-delay-sensitive information. As the demand for mobile broadband access continues to increase, however, further improvements in NR communications technology and beyond may be desired.

SUMMARY

Systems, methods, and apparatus presented herein each have several innovative aspects, no single one of which is solely responsible for the desirable attributes disclosed herein. The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, a method of wireless communication by a base station is provided. The method may include receiving, from a first user equipment (UE), an interference report indicating sidelink communication interference. The method may include selecting a resource pool according to the interference report, the resource pool comprising at least one supplementary sidelink subchannel reserved for receiving sidelink communications and conditionally reserved for transmitting sidelink communications based on the interference report. The method may include transmitting, to the first UE or a second UE causing the sidelink communication interference, configuration information indicating the resource pool.

In another aspect, a method of wireless communication by a UE is provided. The method may include receiving, from a base station, configuration information indicating a resource pool comprising at least one supplementary sidelink subchannel reserved for receiving sidelink communications and conditionally reserved for transmitting sidelink communications based on an interference report indicating sidelink communication interference. The method may include communicating with one or more sidelink UEs according to the configuration information.

In another aspect, a base station including a memory storing instructions and one or more processors coupled with the memory, is provided. The one or more processors may be configured to receive, from a first UE, an interference report indicating sidelink communication interference. The one or more processors may be configured to select a resource pool according to the interference report, the resource pool comprising at least one supplementary sidelink subchannel reserved for receiving sidelink communications and conditionally reserved for transmitting sidelink communications based on the interference report. The one or more processors may be configured to transmit, to the first UE or a second UE causing the sidelink communication interference, configuration information indicating the resource pool.

In another aspect, a UE including a memory storing instructions and one or more processors coupled with the memory, is provided. The one or more processors may be configured to receive, from a base station, configuration information indicating a resource pool comprising at least one supplementary sidelink subchannel reserved for receiving sidelink communications and conditionally reserved for transmitting sidelink communications based on an interference report indicating sidelink communication interference. The one or more processors may be configured to communicate with one or more sidelink UEs according to the configuration information.

In other aspects, additional apparatus and computer-readable mediums for performing the above-disclosed methods are provided.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 4 is a block diagram of example wireless communications between UEs and a base station of FIG. 1, according to aspects of the present disclosure;

FIG. 8 is an example coding for subchannels, according to aspects of the present disclosure;

FIGS. 9A-9B are block diagrams of example wireless communications causing interference between UEs and a base station of FIG. 1, according to aspects of the present disclosure;

FIG. 9C is a block diagram of an example slot indicating the interference of FIGS. 9A-9B, according to aspects of the present disclosure;

FIGS. 10A-10B are block diagrams of example slot scheme containing supplementary sidelink subchannels, according to aspects of the present disclosure;

DETAILED DESCRIPTION

Figure 1:
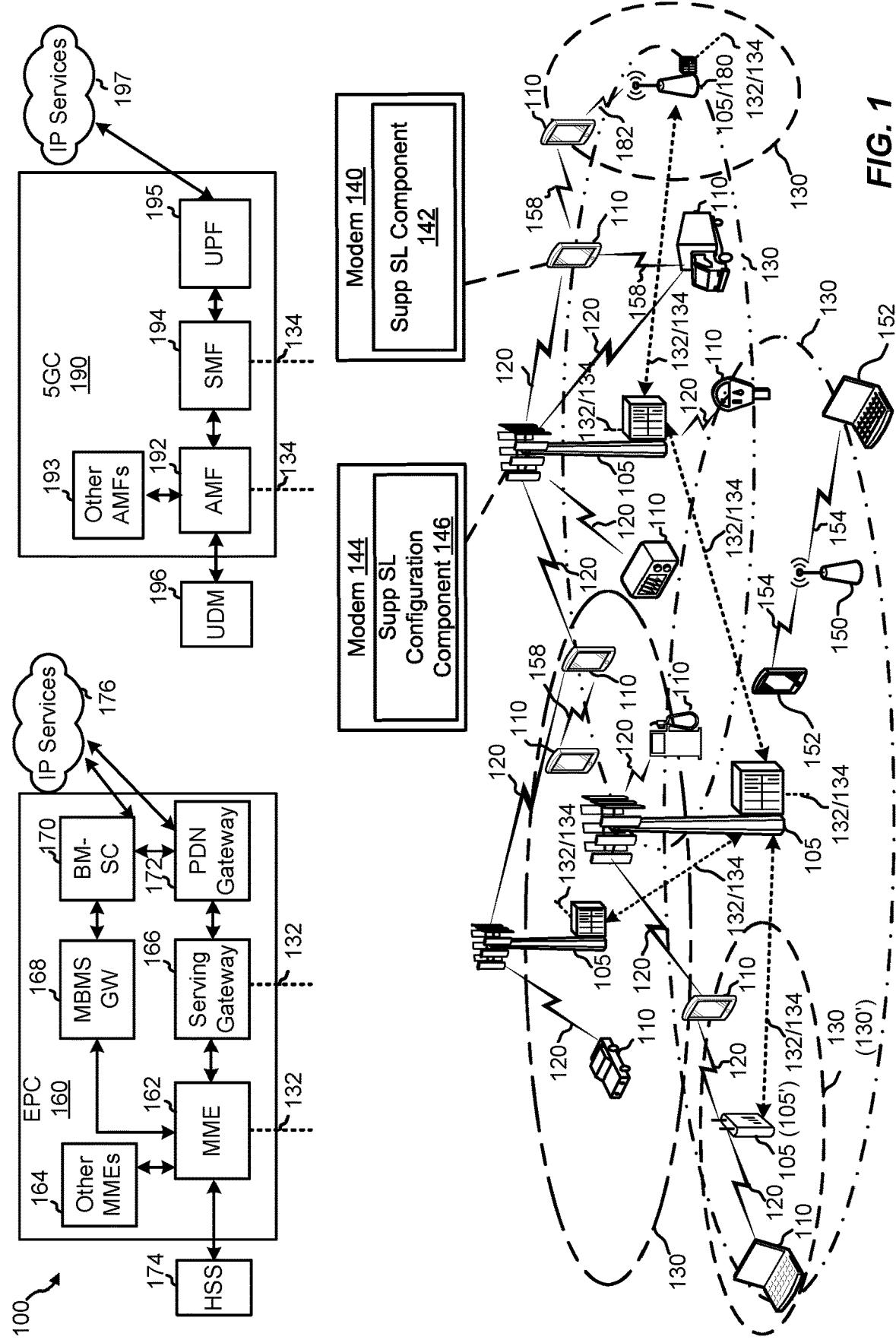
FIG. 1 is a diagram illustrating an example of a wireless communications system and an access network, according to aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

A base station may communicate with a number of user equipments (UEs), some of which may communicate with other UEs via sidelink communications (e.g., device-to-device (D2D) communication, PC5 interface communication). In some situations, sidelink communications between UEs may cause interference (e.g., cross-link interference or self-interference) with downlink (DL) communications of some UEs.

Aspects of the present disclosure provide techniques for mitigating the interference using supplementary sidelink resource configurations in full duplex mode. In an example, a first UE may transmit to a base station an interference report indicating sidelink communication interference the first UE is experiencing. In response to the interference report, the base station may select a resource pool according to the interference report, where the resource pool includes supplementary sidelink subchannels reserved for receiving sidelink communications and conditionally reserved for transmitting sidelink communications based on the interference report. The base station may transmit, to the first UE and/or a second UE causing the sidelink communication interference, configuration information indicating the resource pool. Based on the configuration information, the first UE and/or the second UE may perform sidelink communications (with each other or with other UEs) using the supplementary sidelink sub channels.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

Turning now to the figures, examples of systems, apparatus, methods and computer-readable mediums according to aspects of the present disclosure are depicted. It is to be understood that aspects of the figures may not be drawn to scale and are instead drawn for illustrative purposes.

FIG. 1 is a diagram illustrating an example of a wireless communications system and an access network 100. The wireless communications system (also referred to as a wireless wide area network (WWAN)) includes at least one base station 105, at least one UE 110, at least one Evolved Packet Core (EPC) 160, and at least one 5G Core (5GC) 190. The base station 105 may include macro cells (high power cellular base station) and/or small cells (low power cellular base station). The macro cells include base stations. The small cells include femtocells, picocells, and microcells.

In an example, a UE 110 may include a modem 140 and/or a supplementary sidelink (or supp SL) component 142 (or supp SL component) for mitigating or reducing sidelink interference (e.g., cross-link interference (CLI) or self-interference) from sidelink communications. In another example, a base station 105 may include a modem 144 and/or a supplementary sidelink (or supp SL) configuration component 146 for mitigating or reducing sidelink interference from sidelink communications for a UE.

A base station 105 may be configured for 4G LTE (collectively referred to as Evolved Universal Mobile Telecommunications System (UMTS) Terrestrial Radio Access Network (E-UTRAN)) may interface with the EPC 160 through backhaul links interfaces 132 (e.g., S1, X2, Internet Protocol (IP), or flex interfaces). A base station 105 configured for 5G NR (collectively referred to as Next Generation RAN (NG-RAN)) may interface with 5GC 190 through backhaul links interfaces 134 (e.g., S1, X2, Internet Protocol (IP), or flex interface). In addition to other functions, the base station 105 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base station 105 may communicate directly or indirectly (e.g., through the EPC 160 or 5GC 190) with each other over the backhaul links interfaces 134. The backhaul links 132, 134 may be wired or wireless.

The base station 105 may wirelessly communicate with the UEs 110. Each of the base station 105 may provide communication coverage for a respective geographic coverage area 130. There may be overlapping geographic coverage areas 130. For example, the small cell 105' may have a coverage area 130' that overlaps the coverage area 130 of one or more macro base station 105. A network that includes both small cell and macro cells may be known as a heterogeneous network. A heterogeneous network may also include Home Evolved Node base station (eNBs) (HeNBs), which may provide service to a restricted group known as a closed subscriber group (CSG). The communication links 120 between the base station 105 and the UEs 110 may include uplink (UL) (also referred to as reverse link) transmissions from a UE 110 to a base station 105 and/or downlink (DL) (also referred to as forward link) transmissions from a base station 105 to a UE 110. The communication links 120 may use multiple-input and multiple-output (MIMO) antenna technology, including spatial multiplexing, beamforming, and/or transmit diversity. The communication links may be through one or more carriers. The base station 105/UEs 110 may use spectrum up to Y MHz (e.g., 5, 10, 15, 20, 100, 400, etc. MHz) bandwidth per carrier allocated in a carrier aggregation of up to a total of $Y_x$ MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 110 may communicate with each other using device-to-device (D2D), or sidelink, communication link 158. The D2D communication link 158 may use the DL/UL WWAN spectrum. The D2D communication link 158 may use one or more SL channels, such as a physical SL broadcast channel (PSBCH), a physical SL discovery channel (PSDCH), a physical SL shared channel (PSSCH), and a physical SL control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 105' may operate in a licensed and/or an unlicensed frequency spectrum. When operating in an unlicensed frequency spectrum, the small cell 105' may employ NR and use the same 5 GHz unlicensed frequency spectrum as used by the Wi-Fi AP 150. The small cell 105', employing NR in an unlicensed frequency spectrum, may boost coverage to and/or increase capacity of the access network.

A base station 105, whether a small cell 105' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 110. When the gNB 180 operates in mmW or near mmW frequencies, the gNB 180 may be referred to as an mmW base station. Extremely high frequency (EHF) is part of the radio frequency (RF) in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 110 to compensate for the path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 110 and the EPC 160. Generally, the MME 162 provides bearer and connection management. All user and protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base station 105 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 110 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station 105 may also be referred to as a gNB, Node B, evolved Node B (eNB), an access point, a base transceiver station, a radio base station, an access point, an access node, a radio transceiver, a NodeB, eNodeB (eNB), gNB, Home NodeB, a Home eNodeB, a relay, a repeater, a transceiver function, a basic service set (BSS), an extended service set (ESS), a transmit reception point (TRP), or some other suitable terminology. The base station 105 provides an access point to the EPC 160 or 5GC 190 for a UE 110. Examples of UEs 110 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 110 may be referred to as IoT devices (e.g., parking meter, gas pump, toaster, vehicles, heart monitor, etc.). The UE 110 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
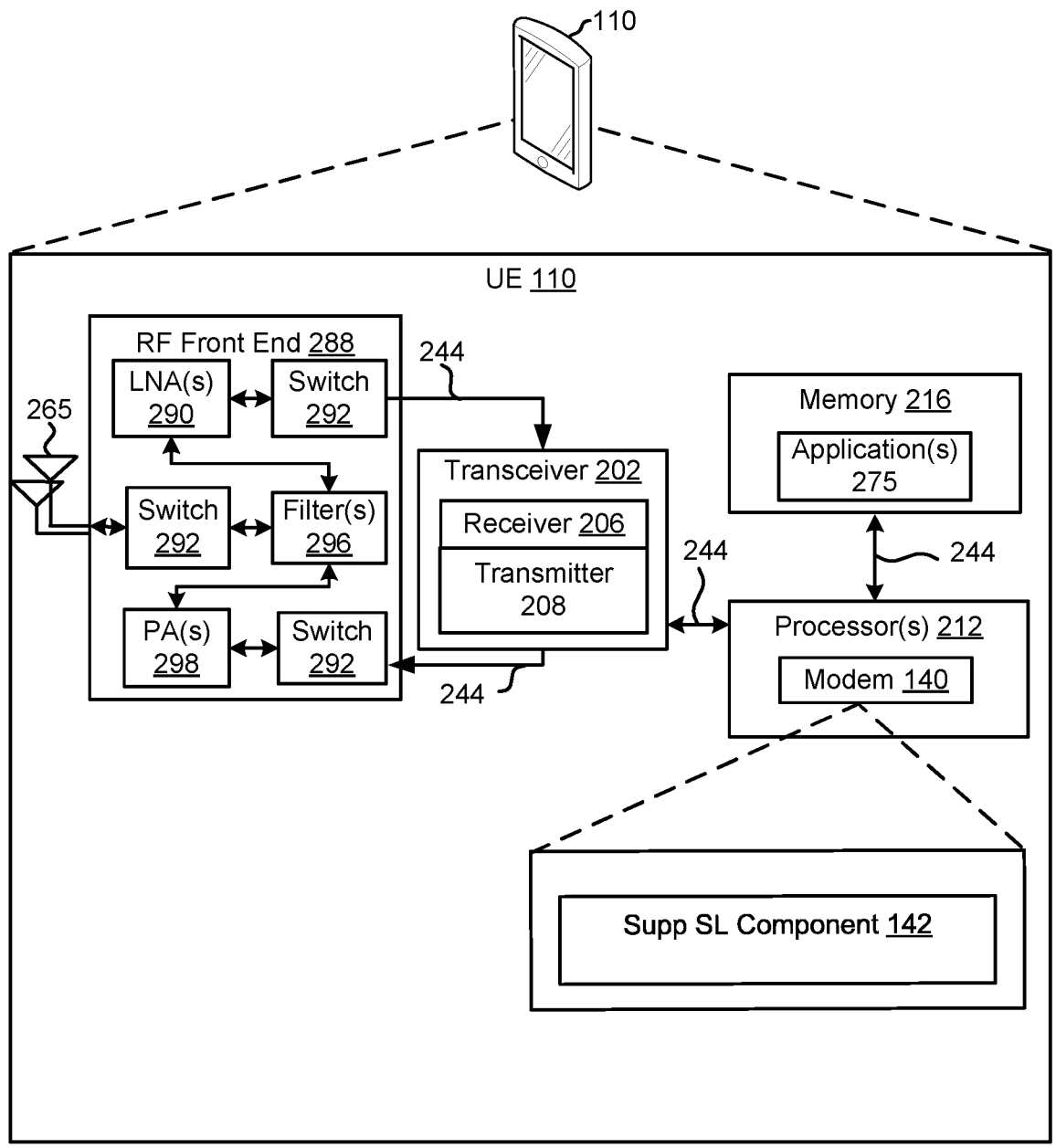
FIG. 2 is a schematic diagram of an example of a user equipment (UE) of FIG. 1, according to aspects of the present disclosure.

Referring to FIG. 2, an example implementation of a UE 110 may include the modem 140 having the supplementary sidelink component 142. The modem 140 and/or the supplementary sidelink component 142 of the UE 110 may be configured to mitigate or reduce sidelink interference (e.g., CLI or self-interference) from sidelink communications, as described in further detail herein.

In some implementations, the UE 110 may include a variety of components, including components such as one or more processors 212 and memory 216 and transceiver 202 in communication via one or more buses 244, which may operate in conjunction with the modem 140 and/or the supplementary sidelink component 142 to enable one or more of the functions, described herein. Further, the one or more processors 212, modem 140, memory 216, transceiver 202, RF front end 288 and one or more antennas 265, may be configured to support voice and/or data calls (simultaneously or non-simultaneously) in one or more radio access technologies. The one or more antennas 265 may include one or more antennas, antenna elements and/or antenna arrays.

In an aspect, the one or more processors 212 may include the modem 140 that uses one or more modem processors. The various functions related to the supplementary sidelink component 142 may be included in the modem 140 and/or the processors 212 and, in an aspect, may be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiving device processor, or a transceiver processor associated with transceiver 202. Additionally, the modem 140 may configure the UE 110 along with the processors 212. In other aspects, some of the features of the one or more processors 212 and/or the modem 140 associated with the supplementary sidelink component 142 may be performed by the transceiver 202.

Also, the memory 216 may be configured to store data used herein and/or local versions of applications 275 or the supplementary sidelink component 142 and/or one or more subcomponents of the supplementary sidelink component 142 being executed by at least one processor 212. The memory 216 may include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, the memory 216 may be a non-transitory computer-readable storage medium that stores one or more computer-executable codes defining the supplementary sidelink component 142 and/or one or more of its subcomponents, and/or data associated therewith, when the UE 110 is operating at least one processor 212 to execute the supplementary sidelink component 142 and/or one or more of the subcomponents.

The transceiver 202 may include at least one receiver 206 and at least one transmitter 208. The receiver 206 may include hardware, firmware, and/or software code executable by a processor for receiving data, the code comprising instructions and being stored in a memory (e.g., computer-readable medium). The receiver 206 may be, for example, an RF receiving device. In an aspect, the receiver 206 may receive signals transmitted by at least one base station 105. The transmitter 208 may include hardware, firmware, and/or software code executable by a processor for transmitting data, the code comprising instructions and being stored in a memory (e.g., computer-readable medium). A suitable example of the transmitter 208 may include, but is not limited to, an RF transmitter.

Moreover, in an aspect, the UE 110 may include the RF front end 288, which may operate in communication with one or more antennas 265 and the transceiver 202 for receiving and transmitting radio transmissions, for example, wireless communications transmitted by at least one base station 105 or wireless transmissions transmitted by the UE 110. The RF front end 288 may be coupled with one or more antennas 265 and may include one or more low-noise amplifiers (LNAs) 290, one or more switches 292, one or more power amplifiers (PAs) 298, and one or more filters 296 for transmitting and receiving RF signals.

In an aspect, the LNA 290 may amplify a received signal at a desired output level. In an aspect, each of the LNAs 290 may have a specified minimum and maximum gain values. In an aspect, the RF front end 288 may use one or more switches 292 to select a particular LNA 290 and the specified gain value based on a desired gain value for a particular application.

Further, for example, one or more PA(s) 298 may be used by the RF front end 288 to amplify a signal for an RF output at a desired output power level. In an aspect, each of the PAs 298 may have specified minimum and maximum gain values. In an aspect, the RF front end 288 may use one or more switches 292 to select a particular PA 298 and the specified gain value based on a desired gain value for a particular application.

Also, for example, one or more filters 296 may be used by the RF front end 288 to filter a received signal to obtain an input RF signal. Similarly, in an aspect, for example, a respective filter 296 may be used to filter an output from a respective PA 298 to produce an output signal for transmission. In an aspect, each filter 296 may be coupled with a specific LNA 290 and/or PA 298. In an aspect, the RF front end 288 may use one or more switches 292 to select a transmit or receive path using a specified filter 296, the LNA 290, and/or the PA 298, based on a configuration as specified by the transceiver 202 and/or processor 212.

As such, the transceiver 202 may be configured to transmit and receive wireless signals through one or more antennas 265 via the RF front end 288. In an aspect, the transceiver 202 may be tuned to operate at specified frequencies such that the UE 110 may communicate with, for example, one or more of the UEs 110, one or more of the base stations 105, or one or more cells associated with one or more of the base stations 105. In an aspect, for example, the modem 140 may configure the transceiver 202 to operate at a specified frequency and power level based on a control entity configuration of the UE 110 and the communication protocol used by the modem 140.

In an aspect, the modem 140 may be a multiband-multimode modem, which may process digital data and communicate with the transceiver 202 such that the digital data is sent and received using the transceiver 202. In an aspect, the modem 140 may be multiband and be configured to support multiple frequency bands for a specific communications protocol. In an aspect, the modem 140 may be multimode and be configured to support multiple operating networks and communications protocols. In an aspect, the modem 140 may control one or more components of the UE 110 (e.g., RF front end 288, transceiver 202) to enable transmission and/or reception of signals from the network based on a specified modem configuration. In an aspect, a modem configuration may be based on the mode of the modem 140 and the frequency band in use.

Figure 3:
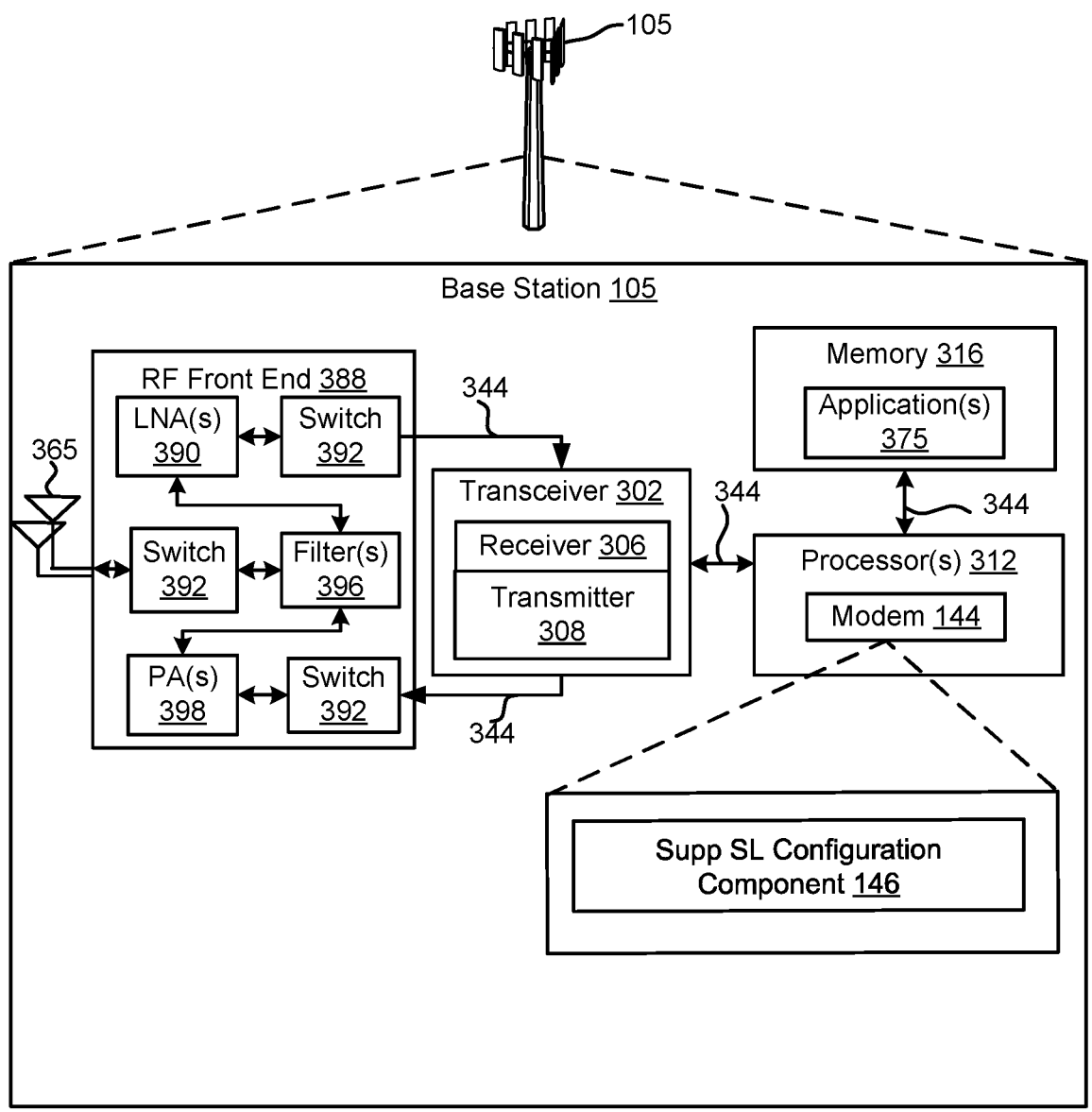
FIG. 3 is a schematic diagram of an example of a base station of FIG. 1, according to aspects of the present disclosure.

Referring to FIG. 3, an example implementation of a base station 105 may include a modem 144 having the supplementary sidelink configuration component 146. The modem 144 and/or the supplementary sidelink configuration component 146 of the base station 105 may be configured to mitigate or reduce sidelink interference from sidelink communications for a UE 110, as described in further detail herein.

In some implementations, the base station 105 may include a variety of components, including components such as one or more processors 312 and memory 316 and transceiver 302 in communication via one or more buses 344, which may operate in conjunction with the modem 144 and/or the supplementary sidelink configuration component 146 to enable one or more of the functions, described herein. Further, the one or more processors 312, the modem 144, the memory 316, the transceiver 302, a RF front end 388, and one or more antennas 365, may be configured to support voice and/or data calls (simultaneously or non-simultaneously) in one or more radio access technologies. The one or more antennas 365 may include one or more antennas, antenna elements and/or antenna arrays.

In an aspect, the one or more processors 312 may include the modem 144 that uses one or more modem processors. The various functions of the modem 144 and/or the processors 312 may be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiving device processor, or a transceiver processor associated with the transceiver 302. Additionally, the modem 144 may configure the base station 105 and the processors 312. In other aspects, some of the features of the one or more processors 312 and/or the modem 144 may be performed by the transceiver 302.

Also, the memory 316 may be configured to store data used herein and/or local versions of applications 375, and/or one or more subcomponents of the modem 144 being executed by at least one processor 312. The memory 316 may include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, the memory 316 may be a non-transitory computer-readable storage medium that stores one or more computer-executable codes defining the modem 144 and/or one or more of the subcomponents, and/or data associated therewith, when the base station 105 is operating at least one processor 312 to execute the modem 144 and/or one or more of the subcomponents.

The transceiver 302 may include at least one receiver 306 and at least one transmitter 308. The at least one receiver 306 may include hardware, firmware, and/or software code executable by a processor for receiving data, the code comprising instructions and being stored in a memory (e.g., computer-readable medium). The receiver 306 may be, for example, an RF receiving device. In an aspect, the receiver 306 may receive signals transmitted by the UE 110. The transmitter 308 may include hardware, firmware, and/or software code executable by a processor for transmitting data, the code comprising instructions and being stored in a memory (e.g., computer-readable medium). A suitable example of the transmitter 308 may include, but is not limited to, an RF transmitter.

Moreover, in an aspect, the base station 105 may include the RF front end 388, which may operate in communication with one or more antennas 365 and the transceiver 302 for receiving and transmitting radio transmissions, for example, wireless communications transmitted by the base stations 105 or wireless transmissions transmitted by the UEs 110. The RF front end 388 may be coupled with one or more antennas 365 and may include one or more low-noise amplifiers (LNAs) 390, one or more switches 392, one or more power amplifiers (PAs) 398, and one or more filters 396 for transmitting and receiving RF signals.

In an aspect, the LNA 390 may amplify a received signal at a desired output level. In an aspect, each of the LNAs 390 may have a specified minimum and maximum gain values. In an aspect, the RF front end 388 may use one or more switches 392 to select a particular LNA 390 and the specified gain value based on a desired gain value for a particular application.

Further, for example, one or more PA(s) 398 may be used by the RF front end 388 to amplify a signal for an RF output at a desired output power level. In an aspect, each PA 398 may have specified minimum and maximum gain values. In an aspect, the RF front end 388 may use one or more switches 392 to select a particular PA 398 and the specified gain value based on a desired gain value for a particular application.

Also, for example, one or more filters 396 may be used by the RF front end 388 to filter a received signal to obtain an input RF signal. Similarly, in an aspect, for example, a respective filter 396 may be used to filter an output from a respective PA 398 to produce an output signal for transmission. In an aspect, each filter 396 may be coupled with a specific LNA 390 and/or PA 398. In an aspect, the RF front end 388 may use one or more switches 392 to select a transmit or receive path using a specified filter 396, the LNA 390, and/or the PA 398, based on a configuration as specified by the transceiver 302 and/or the processor 312.

As such, the transceiver 302 may be configured to transmit and receive wireless signals through one or more antennas 365 via the RF front end 388. In an aspect, the transceiver 302 may be tuned to operate at specified frequencies such that the base station 105 may communicate with, for example, the UEs 110, the base station 105, or one or more cells associated with one or more of the base station 105. In an aspect, for example, the modem 144 may configure the transceiver 302 to operate at a specified frequency and power level based on the repeater configuration of the base station 105 and the communication protocol used by the modem 144.

In an aspect, the modem 144 may be a multiband-multimode modem, which may process digital data and communicate with the transceiver 302 such that the digital data is sent and received using the transceiver 302. In an aspect, the modem 144 may be multiband and be configured to support multiple frequency bands for a specific communications protocol. In an aspect, the modem 144 may be multimode and be configured to support multiple operating networks and communications protocols. In an aspect, the modem 144 may control one or more components of the base station 105 (e.g., RF front end 388, transceiver 302) to enable transmission and/or reception of signals from the network based on a specified modem configuration. In an aspect, the modem configuration may be based on the mode of the modem 144 and the frequency band in use.

Referring to FIG. 4, in an aspect, a sidelink UE 410 may communicate with the UE 110 via DL sidelink communications 420A and UL sidelink communications 420B, which may be examples of the communication link 158 in order to access, for example, IP services 197 via the communication link 120 and the base station 105. In an example, the DL sidelink communications 420A and the UL sidelink communications 420B may include full duplex communications for the sidelink communications 420A, 420B. Sidelink scheduling 425 may be performed to support inter-UE coordination signaling to indicate available resources for the sidelink UE 410.

As will be ascertained through additional details provided herein, full duplex communications for sidelink communications may reduce blocking due to half duplex constraints. For example, full duplex communications on the sidelink communications may eliminate the need for two blind transmissions when communicating with full duplex UEs 110. Full duplex communications for sidelink communications may also support efficient UE-to-network and UE-to-UE relaying. Full duplex communication for sidelink communications may also allow simultaneous sidelink transmissions and sensing in a Mode 2 resource allocation, as will be discussed in further detail herein, and may provide enhanced inter-UE coordination.

Figure 5A:
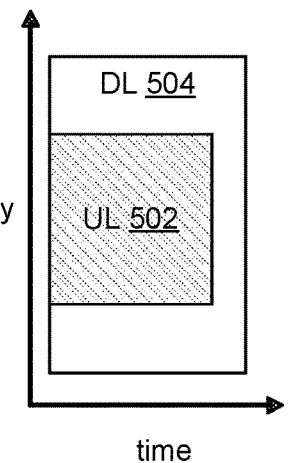
FIG. 5A-5B are block diagrams of example full duplex schemes, according to aspects of the present disclosure.
Figure 5B:
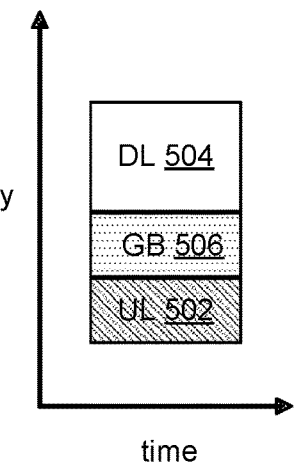

Referring to FIG. 5A-5B, there may be two types of full-duplex operations: an in-band full duplex (IBFD) and a sub-band full duplex (SBFD). In the IBFD scheme, as illustrated by FIG. 5A, the UL signal 502 and the DL signal 504 may overlap in time and frequency which may allow the UL signal 502 and the DL signal 504 to transmit and receive on the same time and frequency resource. In an example, the UL signal 502 and the DL signal 504 may share the same IBFD time/frequency resource resulting in, for example, a full overlap in-band scheme 500 or a partial overlap in-band scheme 510.

In the SBFD scheme 520 (a.k.a. flexible duplex), as illustrated by FIG. 5B, the UL signal 502 and the DL signal 504 may be transmitted and received at the same time but on different frequency resources. In this scheme, The DL signal 504 resource is separated from UL signal 502 resource in the frequency domain. Further, in order to prevent sidelink interference, the UL signal 502 and the DL signal 504 separated by a guard band (GB) 506.

Figure 6:
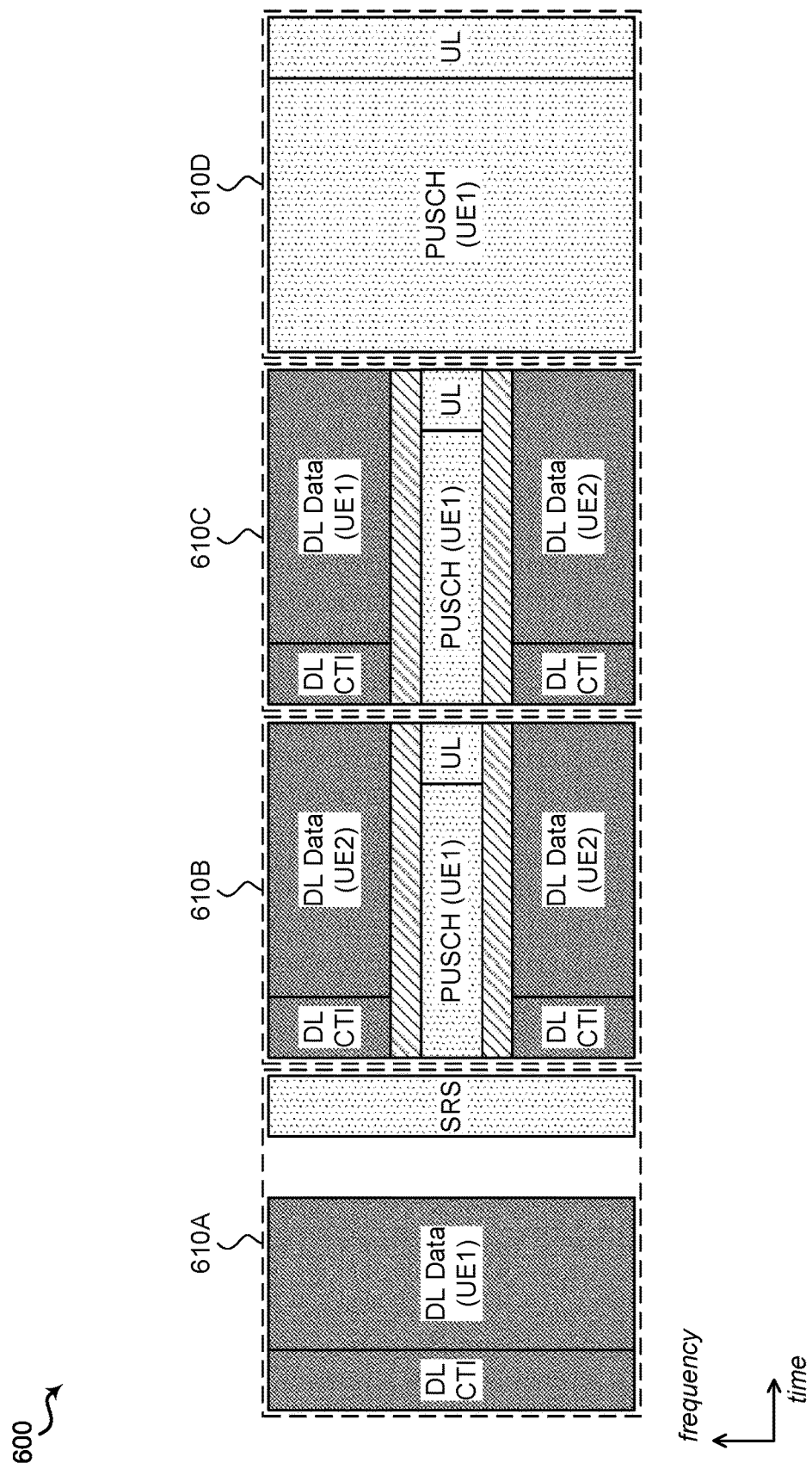
FIG. 6 is block diagram of an example slot scheme, according to aspects of the present disclosure.

Referring to FIG. 6, an example DL+UL slot format 600 may include a slot in which a band, such as bands 610A-610D, is used for both UL and DL transmissions. In an example, the bands may carry both DL and UL information including, but not limited to DL control (CTL), DL data (e.g., for first UE 110 (UE1) and/or second UE (UE2)), physical UL shared channel. The DL and UL transmissions may occur in overlapping bands (e.g., IBFD) or adjacent bands (e.g., SBFD). In a given DL+UL symbol, a half duplex UE may either transmit in a UL band or receive in a DL band, and a full duplex UE may transmit in the UL band and/or receive in the DL band in the same slot. Further, a DL+UL slot may contain DL only symbols, UL only symbols, or full duplex symbols.

Figure 7:
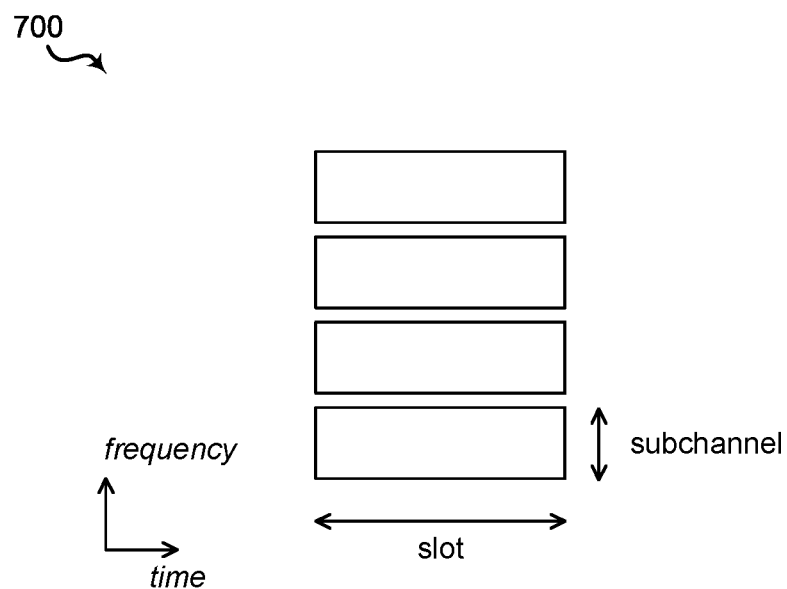
FIG. 7 is a block diagram of an example slot, according to aspects of the present disclosure.

Referring to FIG. 7, an example slot 700 may include a plurality of subchannels. Conventionally, sidelink operations may only be allowed on UL semi-static symbols. A UE 110 may be preconfigured or configured with a set of resource pools, where each resource pool is defined as a set of time-frequency resources. A minimum transmission/reception (i.e., allocation) unit in time is a subchannel, where each subchannel is defined as a number of contiguous resource blocks (RBs).

Each resource pool may further be preconfigured or configured with one of two resource allocation modes: Mode 1 resource allocation (Mode 1 RA) or a Mode 2 resource allocation (Mode 2 RA). For Mode 1 RA, a base station 105 may assign resources for sidelink transmissions. In Mode 1 RA both dynamic allocation via, for example, a DL control information (DCI) format 3-x and configured transmissions (e.g., Type-1 and Type-2) may be supported. For Mode 2 RA, a UE 110 may sense resources. Based on the outcome of sensing (e.g., priority of different transmissions and reference signal received power (RSRP)), the UE 110 may select some resources for transmissions.

In an aspect, the UE 110 may determine a set of slots assigned to a sidelink resource pool based on $(t_0^{SL}, t_1^{SL}, \ldots, t_{T_{max}-1}^{SL})$, where $0 \le t_i^{SL} < 10240 \times 2^\mu$, $0 \le i < T_{max}$, the slot index may be relative to slot #0 of a radio frame corresponding to system frame number (SFN) 0 of the serving cell or direct frame number (DFN) 0, the set includes all the slots except the following slots, $N_{S\_SSB}$ slots in which sidelink-synchronization signal (S-SS)/physical broadcast channel (PBCH) (S-SSB) block is configured, $N_{nonSL}$ slots in each of which at least one of Y-th, (Y+1)-th, . . . , (Y+X−1)-th OFDM symbols are not semi-statically configured as UL as per the higher layer parameter tdd-UL-DL-ConfigurationCommon or sl-TDD-Configuration, where Y and X are set by the higher layer parameters sl-StartSymbol and sl-LengthSymbols, respectively.

The reserved slots may be determined by the following operations: 1) the remaining slots excluding N_(S_SSB) slots and N_nonSL slots from the set of all the slots are denoted by (l_0,l_1, . . . , l_((10240×2^μ−N_(S_SSB)−N_nonSL−1))) arranged in increasing order of slot index; and 2) a slot l_r (0≤r<10240×2^μ−N_(S_SSB)−N_nonSL) belongs to the reserved slots if $$r=[(m \cdot (10240 \times 2^\mu - N\_(S\_SSB) - N\_\text{nonSL}))/N\_\text{reserved}],$$

here m=0,1, . . . ,N_reserved−1 and N_reserved=(10240× 2^μ−N_(S_SSB)−N_nonSL) mod L_bitmap where L_bitmap denotes the length of bitmap configured by higher layers. The slots in the set may be arranged in increasing order of slot index.

In an aspect, the UE 110 may determine the set of slots assigned to a sidelink resource pool as follows: a bitmap ($b_0$, $b_1$, . . . , $b_{L_{bitmap}-1}$) associated with the resource pool may be used where $L_{bitmap}$, the length of the bitmap, is configured by higher layers. A slot $t_k^{SL}$ ($0 \le k < 10240 \times 2^\mu - N_{SSB} - N_{nonSL} - N_{reserved}$) may belong to the set if $b_{k'}=1$ where k'=k mod $L_{bitmap}$.

The slots in the set may be re-indexed such that the subscripts i of the remaining slots $t'_i^{SL}$ are successive {0, 1, . . . , T'$_{max}$−1}, where T'$_{max}$ is the number of the slots remaining in the set.

In an aspect, sidelink communications may take place in transmission or reception resource pools, where a minimum resource allocation unit may be a subchannel in frequency. In the frequency domain, a sidelink resource pool may consist of a number (e.g., numSubchannel) of contiguous subchannels, where a subchannel may consist of size (e.g., subchannelsize) of contiguous physical RBs (PRBs), and where number and size are higher layer (e.g., radio resource control (RRC) layer) parameters.

In an example resource allocation in time may be one slot. Some slots may not be available for sidelink communications, and some slots may contain feedback resources. In an example, a higher layer (e.g., RRC layer) configuration may be performed through preconfiguration (e.g., preloaded on UE 110) or through configuration (e.g., from base station 105).

Referring to FIG. 8, in an aspect, an example of higher layer (e.g., RRC layer) configuration of a sidelink resource pool may include an indication of a subchannel size 810 and a starting subchannel number 820. In this example, the minimum size of a subchannel may be configured to be 10 contiguous RBs, as indicated by the subchannel size 810.

Referring to FIGS. 9A-9C, in an aspect, for SBFD, sidelink transmissions in subchannels adjacent to DL resources may cause interference to DL-receiving transmission at nearby UEs. For example, as illustrated by FIG. 9A, a base station 105 may transmit DL transmissions 902 to a first UE 110a and a second UE 110b, and the second UE 110b may communicate with a third UE 110c via a sidelink transmission 904. As illustrated by FIG. 9C, a sidelink resource 920 for the sidelink communication 904 from the second UE 110b may cause CLI 910 with an adjacent DL resource 922 for the DL transmissions 902 of the first UE 110a. In other words, the sidelink communication 904 interferes with the DL reception at the first UE 110a.

In another example, as illustrated by FIG. 9B, the base station 105 may transmit a DL transmission 906 to a fourth UE 110d, and the fourth UE 110d may communicate with a fifth UE 110e via a sidelink transmission 908. As illustrated by FIG. 9C, a second sidelink resource 924 for the sidelink transmission 908 from the fourth UE 110d may cause self-interference 912 with an adjacent second DL resource 926 for the DL transmission 906 of the fourth UE 110d. In other words, the sidelink transmission 908 interferes with the DL reception at the fourth UE 110d.

To prevent the interference, guard bands between DL resources and SL resources can be used to prevent interference.

Referring to FIG. 10A-10B, aspects of the present disclosure provide techniques for a type of sidelink subchannel that may be conditionally used for sidelink transmissions based on sidelink interference (e.g., CLI or self-interference) levels. Turning to FIG. 10A, example SBFD slots 1000 may include regular sidelink subchannels 1002 and supplementary sidelink subchannels 1020. In an example, the supplementary sidelink subchannels 1020 may include subchannels which are used for sidelink receiving communications and conditionally used for sidelink transmission communications based on existence of sidelink interferences (e.g., CLI or self-interference) to nearby UEs.

In a first example, a resource pool may contain both types of sidelink subchannels. In an example, for half duplex slots (e.g., UL slots), all the subchannels may be regular sidelink subchannels. In SBFD slots, subchannels adjacent to DL allocation (e.g., DL 1010) may be supplementary sidelink subchannels 1020.

In a second example, a supplementary sidelink resource pool may contain only supplementary sidelink subchannels. In this example, subchannels may not be contagious in the supplementary sidelink resource pool. Further, a supplementary sidelink resource pool may not be backward compatible with contagious subchannels. In comparison to the first example, a supplementary sidelink resource pool of the second example may have limited flexibility in resource allocation.

Referring to FIGS. 10A-10B, a base station 105 may configure separate RB sets for subchannels in SBFD slots. Configuration of supplementary sidelink subchannels in SBFD slots may include, in a first example, uniform subchannel widths (e.g., number of RBs) for the supplementary sidelink subchannels 1020 may be the same widths as the regular sidelink subchannels 1002. In an second example, as illustrated by FIG. 10B, an example SBFD slot 1050 may include supplementary sidelink subchannels 1030 having different subchannel widths that are not the same as the widths for the regular sidelink subchannels 1002. Use of different subchannel widths may provide more flexibility, as compared to uniform widths. For example, guard band may be 5 RBs and minimum subchannel size may be 10 RBs.

Figure 11:
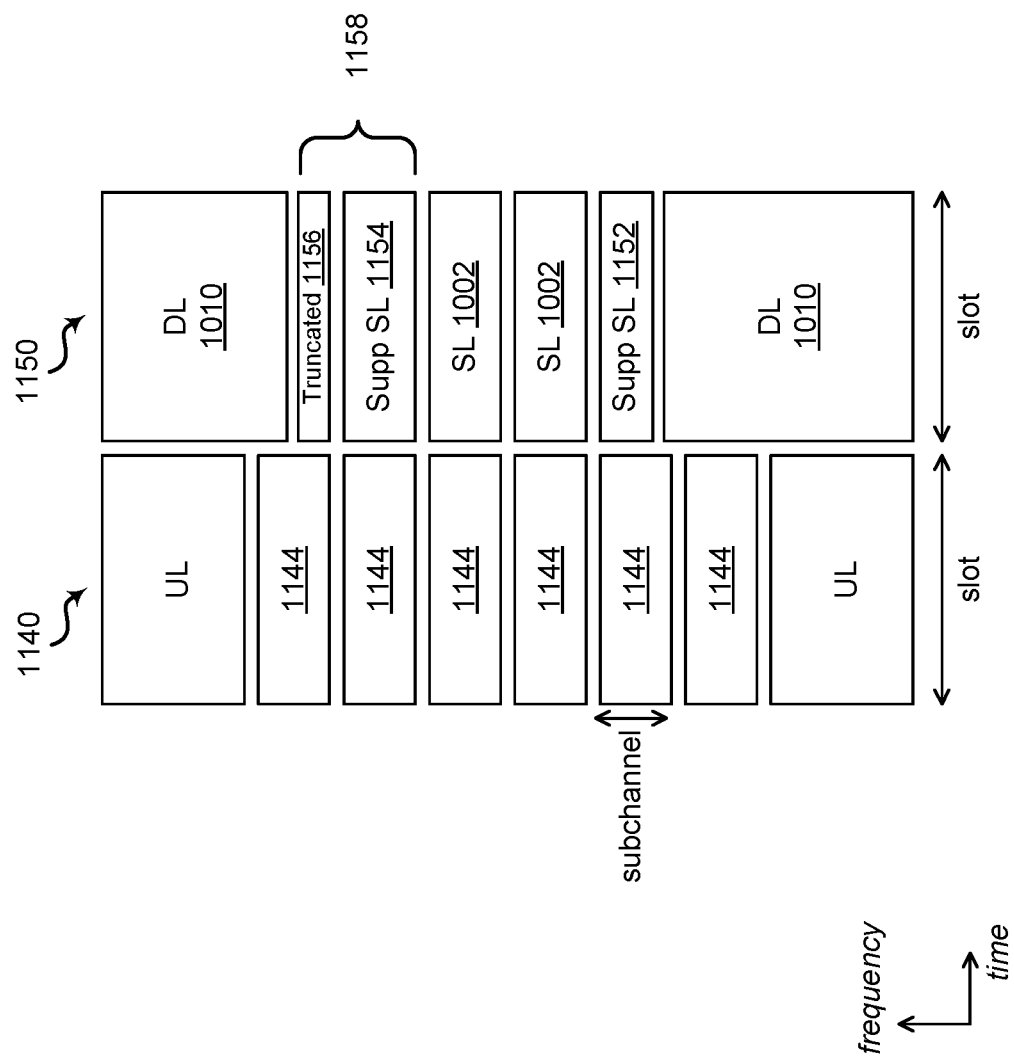
FIG. 11 is a block diagram of another example slot scheme containing supplementary sidelink subchannels, according to aspects of the present disclosure.

Referring to FIG. 11, in an aspect, RBs for a sidelink resource pool may be configured based on the bandwidth of regular UL slots 1144 of a UL resource scheme 1140. For example, as illustrated, the regular sidelink subchannels 1002, and supplementary sidelink subchannels 1152, 1154 of a resource pool 1150 may be configured based on UL subchannels 1144. In this example, a UE 110 may automatically truncate a resource pool in SBFD slots to the UL portion of the bandwidth, resulting, for example, with a truncated portion 1156 having X RBs, where X is a positive integer. In an example, X RBs may be compared to Y RBs, where Y is a threshold based on a function of subchannel size. If X is less than Y, then the truncated portion 1156 (e.g., X RBs) may be appended to an adjacent sidelink subchannel (e.g., supplementary sidelink subchannel 1154) resulting in a supplementary sidelink subchannel 1158. Alternatively, if X RBs is greater than or equal to Y RBs, then the truncated portion 1156 is considered a separate supplementary sidelink subchannel.

As previously described, each resource pool may be preconfigured or configured with one of two resource allocation modes: Mode 1 RA or Mode 2 RA. In mode 1 RA, the base station 105 may have control over resource allocation in both sidelink and DL resources. In an aspect, the base station 105 may determine the availability of supplementary sidelink subchannels for each UE 110 based on interference reports (e.g., reports indicating CLI or self-interference). The interference reports may include interference measurements and may be used to identify one or more aggressor UEs 110 (e.g., UEs causing interference; UE 110b of FIG. 9A). Measurement reporting may be made, for example, via RRC or layer 3 (L3) reporting or through dynamic and semi-persistent reporting (e.g., layer 1 (L1) or layer 2 (L2) reporting) for mitigating or reducing interference in an SBFD mode.

In another aspect, additional enhancements for interference measurements and reporting may include zone identification (ID) information to identify nearby aggressor UEs 110 (e.g., UE 110b of FIG. 9A). For example, aggressor UEs 110 may send reference signals (RSs) with zone IDs in sidelink control information (SCI) signals (e.g., SCI2) and/or to send RSs which are scrambled with zone ID (e.g., scrambling ID to differentiate different sequences used to generate RSs) to enable a UE 110 without sidelink capabilities to identify an aggressor UE's zone ID. Victim UEs (e.g., UE 110a of FIG. 9A) may measure and send interference reports (containing their own zone ID) to the base station 105 along with zone IDs of one or more of the aggressor UEs (e.g., UE 110b of FIG. 9A). The base station 105 may combine interference reports from victim UEs 110 to construct an interference map representing a geographical coverage area of the base station 105 and locations of which UEs interfere with the victim UEs.

Figure 12:
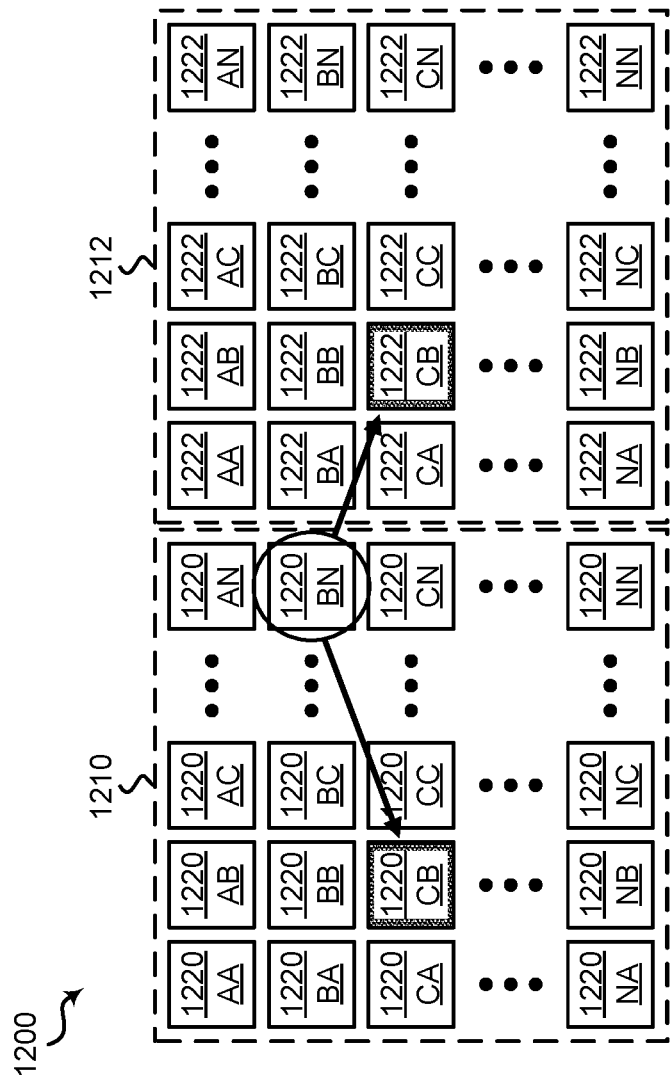
FIG. 12 is a block diagram of a zone identification mapping, according to aspects of the present disclosure.

Referring to FIG. 12, an example interference map 1200 may include zone ID information obtained from the interference reports. The interference map 1200 may include an area 1210 having a plurality of zones 1220. Each of the zones 120 may include unique zone IDs AA-NN. The interference map 1200 may also include an adjacent area 1212 having a plurality of zones 1222, where each of the zones 1222 have zone IDs AA-NN (e.g., same zone IDs used for zones 1220). Thereby, the zone IDs AA-NN may be repeated for each area of the interference map 1200.

In an example, a victim UE 110 having zone ID BN of zone 1220 may perform interference measurements and send an interference report to a base station 105. The interference report may include zone ID information indicating that an aggressor UE 110 having zone ID CB of zone 1220 is causing interference (e.g., CLI). In response to the interference report, the base station 105 may determine availability of supplementary sidelink subchannels for the aggressor UE 110.

In an aspect, the base station 105 may correct ambiguities of zone ID information using one or more techniques. In an example, the interference report may include zone ID information indicating that a second aggressor UE 110 having zone ID CB of zone 1222 is also causing interference (e.g., CLI). Because the zone IDs are the same for both aggressor UEs 110, ambiguity may be created in the interference map generated by the base station 105. Accordingly, the base station 105 may combine zone ID information with additional information using one or more techniques to resolve the ambiguities. The additional information may include, for example, sidelink positioning information (e.g., angle of beam arrival at base station 105) that identifies nearby sidelink UEs (e.g., UE 110c of FIG. 9A), synchronization signal block (SSB) index information, channel status information reference signal (CSIRS) beam sweeping information, pathloss information (e.g., from power headroom (PHR) report), timing advance information. In an example, the PHR report may include PH and $P_{cmax}$, where $P_{cmax}$ is the maximum power that can be used for transmission by the UE 110. In an example, the base station may infer the powerloss PL from the PHR report, as powerloss is the only unknown variable in the following formula:

$$PH = P_{cmax,c}(i) - \{10 \log_{10}(M_{PUSCH,c}(i)) + P_{0,c}(j) + \alpha_c(j) \cdot PL_c(k) + \Delta_{TF,c}(i) + f_c(i,l)\}$$

, where c is the serving cell, i is an index corresponding to an UL (e.g., PUSCH) transmission occasion, j and l are indexes, M is a value corresponding to the bandwidth, a is a value obtained from a configuration, $\Delta_{TF}$ is a power adjustment of the UL transmission, and f is the carrier.

Figure 13:
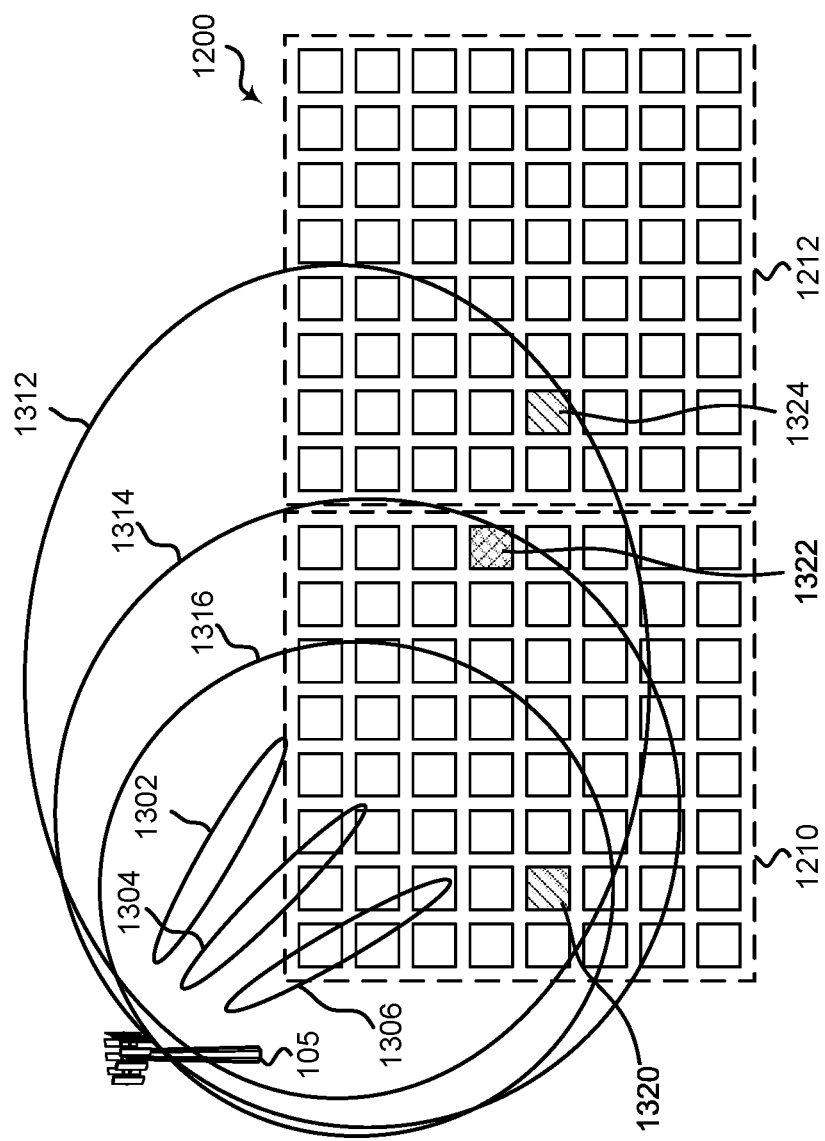
FIG. 13 is a block diagram of techniques for correlating synchronized signal blocks (SSBs) and zone identification mapping, according to aspects of the present disclosure.

Referring to FIG. 13, SSB index information may be used to correct ambiguities in the zone ID information. In an example, a base station 105 may transmit a number of SSB signals 1302, 1304, 1306 in different directions for beam forming, and the SSB signals 1302, 1304, 1306 may correspond to respective beam coverage areas 1312, 1314, 1316. Any zone (e.g., zone 1320, zone 1322, or zone 1324) within the respective beam coverage areas 1312, 1314, 1316 may be identifiable and may therefore correspond to a respective SSB signal 1302, 1304, or 1306. Accordingly, the SSB index of the SSB signal may be used to distinguish between zones having the same zone ID but are within different areas 1210, 1212.

Figure 14:
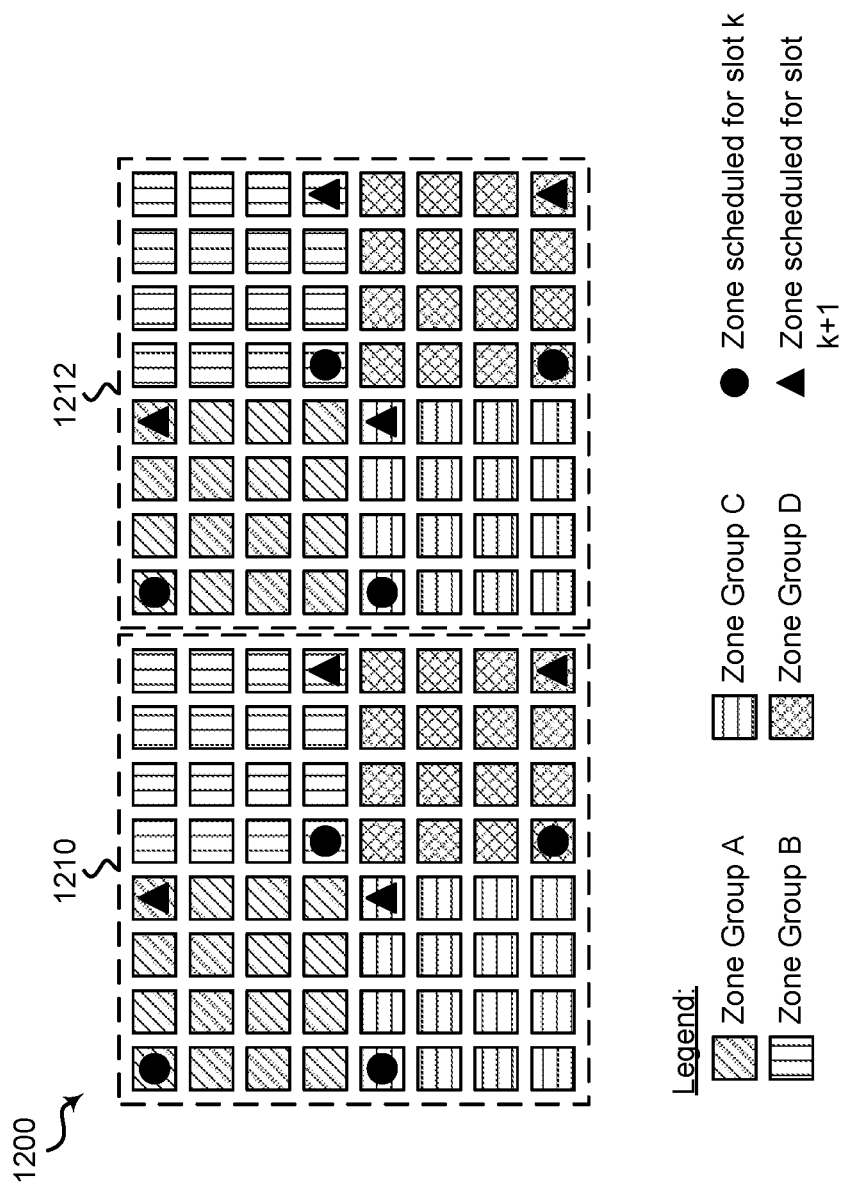
FIG. 14 is a block diagram of techniques for randomizing scheduling of zones in a zone identification map, according to aspects of the present disclosure.

In another aspect of mode 1 RA, randomized scheduling may be used by the base station 105 for scheduling the supplementary sidelink resources. Referring to FIG. 14, the base station 105 may define groups of zone IDs in each of the areas 1210, 1212 of the interference map 1200, and also define a mapping function between zone IDs in each of the groups and SBFD sidelink slot indices. For example, in an SBFD sidelink slot index "k", a first set of zone IDs, where a single first zone from each group of zones (indicated by circles in FIG. 14) may be allowed to transmit in the supplementary sidelink subchannels, and in slot index "k+1", a second set of zone IDs, where a single second zone from each group of zones (indicated by triangles in FIG. 14) may be allowed to transmit in the supplementary sidelink subchannels. In an example, a hashing function may be used by the base station 105 to determine when to use supplementary sidelink resources based on a zone ID. The technique of random scheduling may not eliminate interference (e.g., CLI) but may help reduce it.

In an aspect of mode 2 RA, semi-persistent activation/deactivation of supplementary sidelink subchannels may be used. In an example, the supplementary sidelink subchannels may be activated or deactivated by the base station 105. The base station 105 may send an activation message that indicates a set of parameters that can be used in supplementary sidelink subchannels (e.g., max modulation and coding scheme (MCS), max power). These parameters may be updated by, for example, a reactivation DCI message.

In an aspect, supplementary sidelink subchannels may be eligible for both transmission and receiving by default, if one or more sidelink UEs 110 (or aggressor UEs; e.g., UE 110b of FIG. 9A) are causing CLI to DL reception at a nearby victim UE 110 (e.g., UE 110a of FIG. 9A), and the victim UE 110 has sidelink capabilities.

In an aspect, a victim UE 110 may send a broadcast for UEs in nearby zones requesting to stop transmissions in supplementary sidelink subchannels. In an example, the victim UE 110 may indicate a priority level in the broadcast message, such that aggressor UEs 110 will stop transmissions if their sidelink transmission has a lower priority than the priority level indicated by the broadcast message.

In another aspect, a victim UE 110 may report interference (e.g., CLI) to the base station 105, and the base station 105 may send an activation/deactivation message to the aggressor UEs 110.

In an example, the broadcast message and/or the deactivation message may indicate a timer for reactivation of supplementary sidelink resources, and after the timer expires supplementary sidelink resources may be used for transmission and receiving. For example, the timer may indicate a number of slots (e.g., 10 slots) that an aggressor UE 110 should not use the supplementary sidelink resources.

In an example, the base station 105 may transmit a control message, that is resource pool specific or zone specific, to eliminate interference (e.g., CLI) from victim UEs with UE-to-network (e.g., Uu) capabilities.

In another example, the base station 105 may send a DCI message (or command) (e.g., either via broadcast or via group-common physical DL control channel (PDCCH)) to the sidelink UEs (e.g., UE 110b of FIG. 9A) with an indication to not use the supplementary sidelink subchannels. The indication may be, for example, zone based and/or priority based (e.g., not allowed for packets with priority below a priority threshold). The indication may, for example, explicitly indicate the slots in which supplementary sidelink subchannels should not be used or may provide a time duration for not using the supplementary sidelink subchannels.

In another aspect, for Mode 2 RA, supplementary sidelink subchannels may only be eligible for receiving and not transmission. In an example, supplementary sidelink subchannels may not be used for transmission until cleared by a base station 105 or a UE 110 capable of both UE-to-UE (e.g., PC5 interface communications) and UE-to-network (e.g., Uu interface communications). In an example, activation/deactivation of the supplementary sidelink subchannels may be based on a subset (or group) of zones within in the area 1210, 1212 of FIG. 12. Further, supplementary sidelink subchannels may be activated (or reactivated) based on a semi-static activation rule and/or an expiration timer, as described herein.

Figure 15:
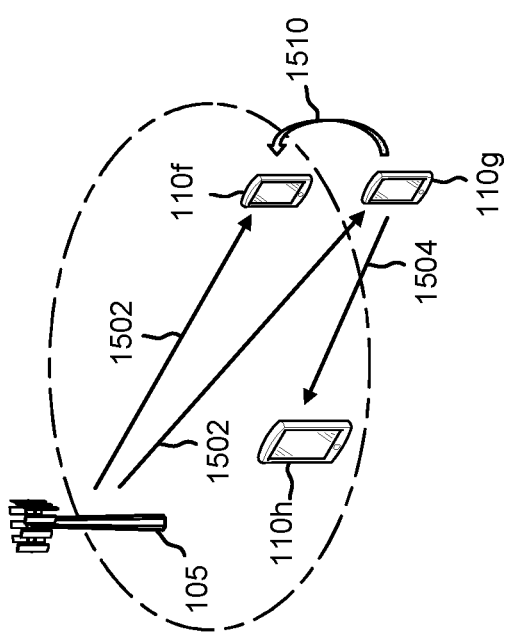
FIG. 15 is a block diagram of another example wireless communication causing interference between UEs and a base station of FIG. 1, according to aspects of the present disclosure.

Referring to FIG. 15, in another example, a base station 105 may transmit DL transmissions 1502 to a sixth UE 110f and a seventh UE 110g, and the seventh UE 110g may communicate with a eighth UE 110h via a sidelink transmission 1504. As illustrated by FIG. 15, the sidelink transmission 1504 from the seventh UE 110g may cause CLI 1510 to the DL transmission 1502 of the sixth UE 110f. Accordingly, the base station 105 may active the supplementary sidelink subchannels only if a UE is in-coverage, to prevent out-of-coverage UEs 110 (e.g., UE 110g) from causing interference to cell-edge UEs 110 (e.g., UE 1100.

In another aspect, in Mode 2 RA, in addition to reserving supplementary sidelink resources for transmission, a victim UE 110 (e.g., UE 110a of FIG. 9A) having both sidelink (e.g., PC5 interface) and UE-to-network (e.g., Uu interface) capabilities may reserve supplementary sidelink resources causing interference (e.g., CLI) to the DL communication (e.g., DL transmissions 902 of FIG. 9A). In an example, the victim UE 110 may make a special reservation for clearing supplementary sidelink subchannels by sending a request message for the special reservation to nearby UEs 110. The special reservation may indicate to the nearby UEs 110 that the victim UE 110 is reserving the supplementary sidelink subchannels. For the reservation, the victim UE 110 may or may not transmit data on the supplementary sidelink subchannel resources. Instead, the victim UE 110 uses the supplementary sidelink subchannel resources to block nearby aggressor UEs 110 from using these resources.

In an example, when the victim UE 110 announces the special reservation to block the use of the supplementary sidelink subchannels, the victim UE 110 may include a priority level of a DL communication (e.g., DL transmissions 902 of FIG. 9A) receiving interference. Any nearby UE 110, that receives the special reservation and having a packet priority greater than the priority level indicated by the special reservation, may ignore the special reservation. Further, in another example, the nearby UEs 110 may only block sidelink transmissions having a lower priority compared to the priority level of the DL communication corresponding of the victim UE 110.

Figure 16:
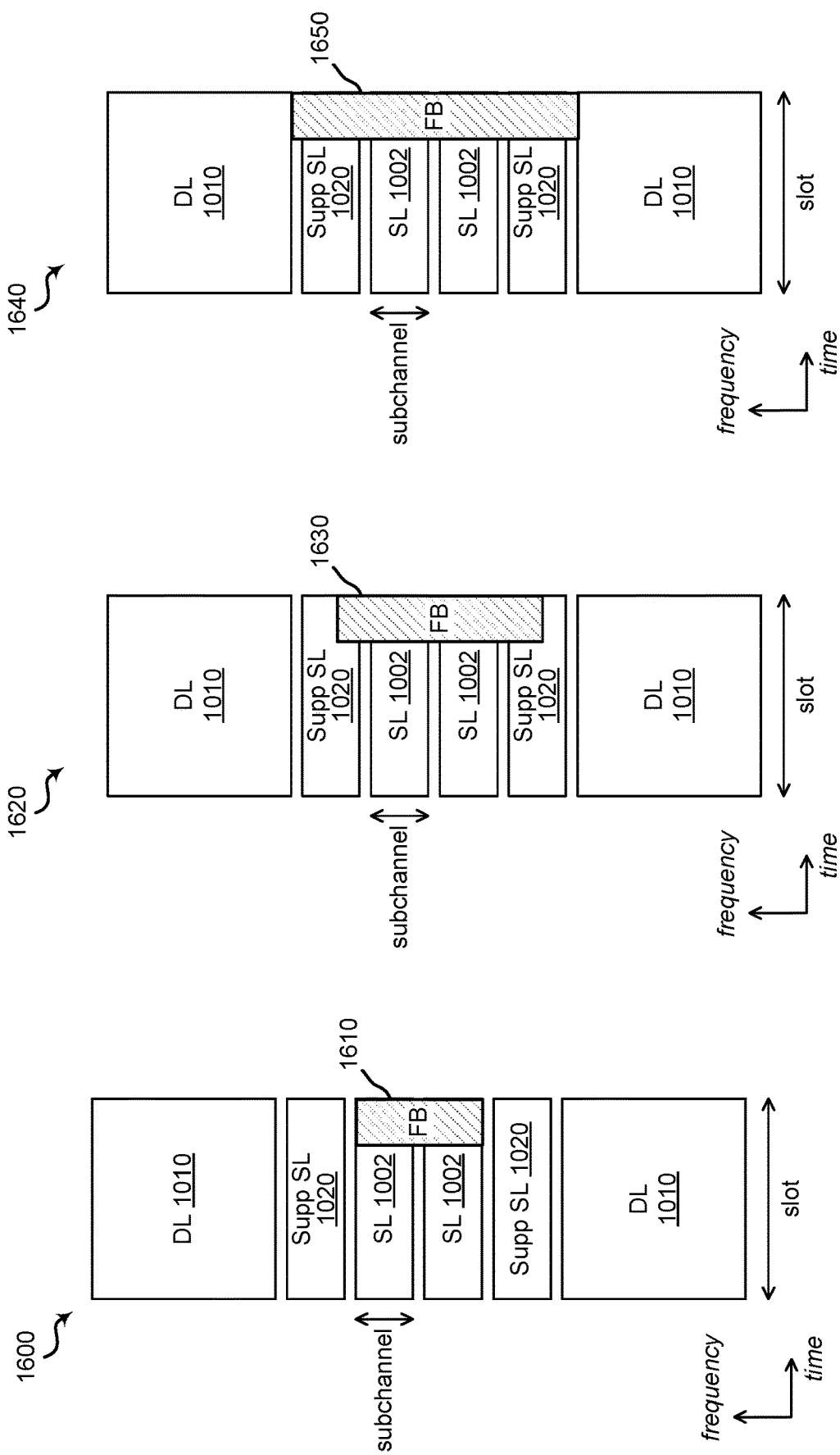
FIGS. 16A-16C are block diagrams of example slot schemes incorporating feedback, according to aspects of the present disclosure.

Referring to FIGS. 16A-16C, in an aspect, physical sidelink feedback channels (PSFCH) may be mapped to resources in SBFD slots. For example, the feedback (or FB) 1610, 1630, 1650 may be mapped to RBs of the example SBFD slots 1600, 1620, 1640. In an example, as illustrated by FIG. 16A, RBs in the supplementary sidelink subchannels 1020 of the SBFD slot 1600 may not be used for feedback 1610 (e.g., PSFCH). In a second example, as illustrated by FIG. 16B, only guard band RBs in the supplementary sidelinks subchannels 1020 of the SBFD slot 1620 may not be used for feedback 1630 (e.g., PSFCH). In this example, the guard bands may be smaller than the supplementary sidelink subchannel size. In a third example, as illustrated by FIG. 16C all RBs in the SBFD slots 1640 may be used for feedback 1650 (e.g., PSFCH).

In an aspect, the first example of FIG. 16A may provide a straight forward technique for providing feedback, as compared to the second example of FIG. 16B and the third example of FIG. 16C, because the resources for the regular sidelink subchannels 1002 may always be available. In comparison, the resources for the supplementary sidelink subchannels 1020 of the second example of FIG. 16B and the third example of FIG. 16C may not always be available because of, for example, priority levels.

Figure 17:
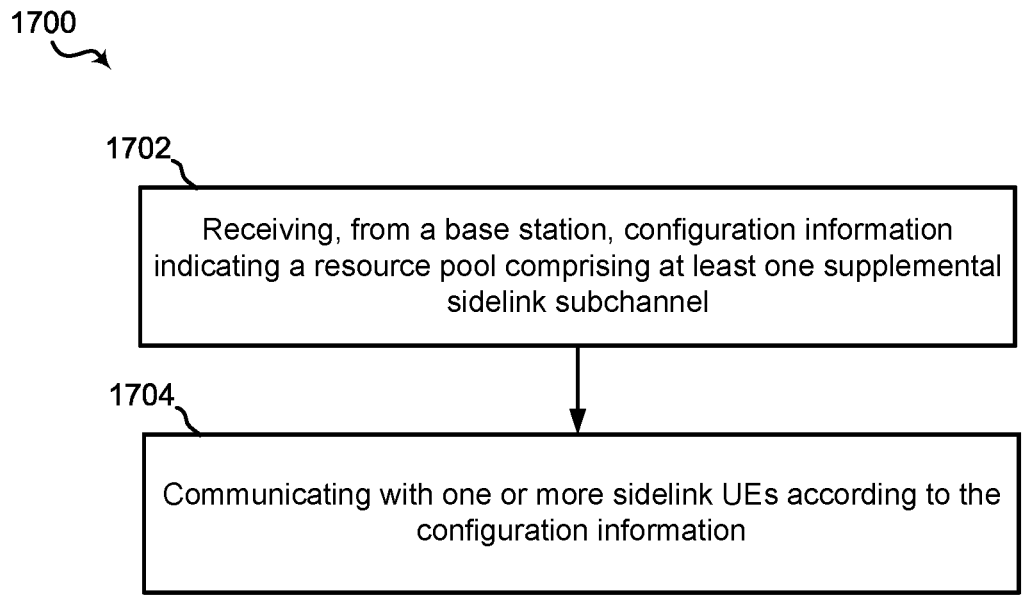
FIG. 17 is flowchart of an example method performed by the UE of FIG. 1, according to aspects of the present disclosure.

Referring to FIG. 17, an example of a method 1700 for wireless communications may be performed by the UE 110 of the wireless communication network 100. For example, operations of the method 1700 may be performed by the supplementary sidelink component 142, the modem 140, the transceiver 202, the processor 212, the memory 216, and or any other component/subcomponent of the UE 110.

At block 1702, the method 1700 may include receiving, from a base station, configuration information indicating a resource pool comprising at least one supplementary sidelink subchannel reserved for receiving sidelink communications and conditionally reserved for transmitting sidelink communications based on an interference report indicating sidelink communication interference. For example, the supplementary sidelink component 142, the modem 140, the transceiver 202, the processor 212, and/or the memory 216 of the UE 110, and/or one or more additional components/subcomponents of the UE 110 may be configured to or may comprise means for receiving, from a base station, configuration information indicating a resource pool comprising at least one supplementary sidelink subchannel reserved for receiving sidelink communications and conditionally reserved for transmitting sidelink communications based on an interference report indicating sidelink communication interference.

For example, the receiving of the configuration information at block 1702 may include receiving by the supplementary sidelink component 142, the modem 140, the transceiver 202, the processor 212, and/or the memory 216 of the UE 110, via, for example, the antenna 265 and the RF front end 288, from the base station 105, configuration information indicating a resource pool comprising at least one supplementary sidelink subchannel reserved for receiving sidelink communications and conditionally reserved for transmitting sidelink communications based on an interference report indicating sidelink communication interference.

At block 1704, the method 1700 may include communicating with one or more sidelink UEs according to the configuration information. For example, the supplementary sidelink component 142, the modem 140, the transceiver 202, the processor 212, and/or the memory 216 of the UE 110, and/or one or more additional components/subcomponents of the UE 110 may be configured to or may comprise means for communicating with one or more sidelink UEs according to the configuration information.

For example, the communicating at block 1704 may include communicating by the supplementary sidelink component 142, the modem 140, the transceiver 202, the processor 212, and/or the memory 216 of the UE 110, via, for example, the antenna 265 and the RF front end 288, from the base station 105, with the sidelink UE 110c of FIG. 9A according to the configuration information.

Figure 18:
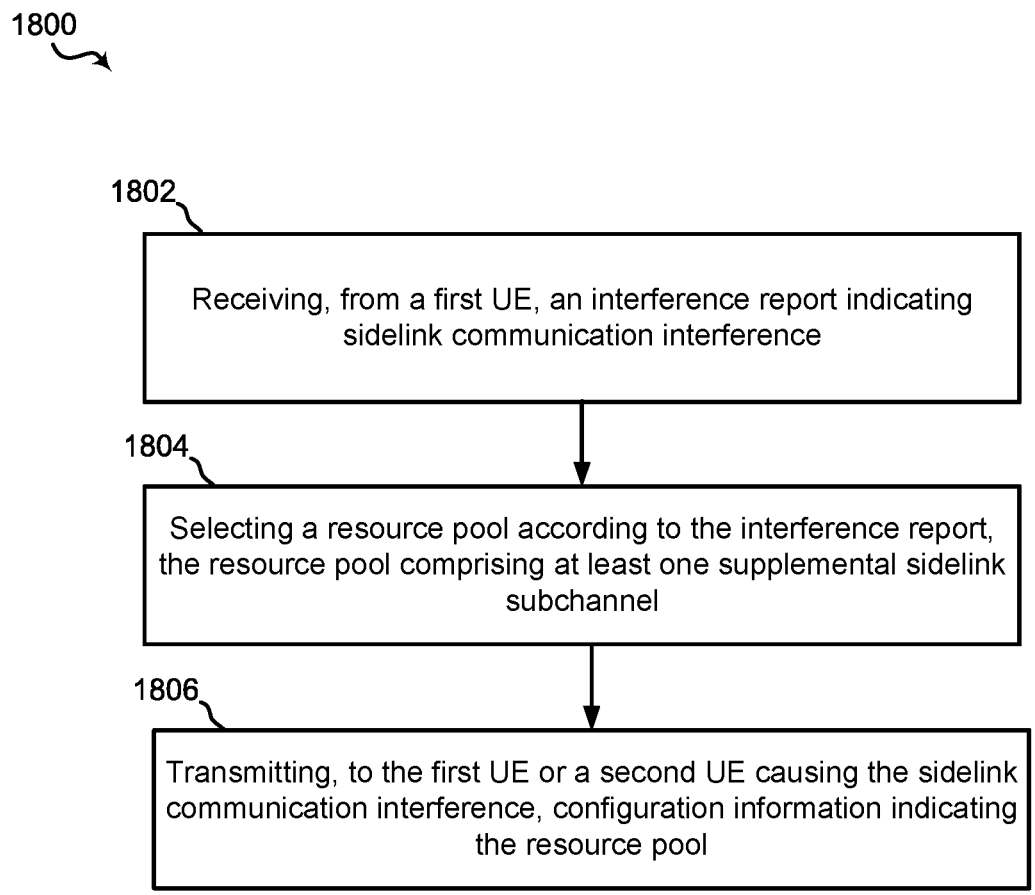
FIG. 18 is flowchart of another example method performed by the base station of FIG. 1, according to aspects of the present disclosure.

Referring to FIG. 18, an example of a method 1800 for wireless communications may be performed by the base station 105 of the wireless communication network 100. For example, operations of the method 1800 may be performed by the supplementary sidilink configuration component 146, the modem 144, the transceiver 302, the processor 312, the memory 316, and or any other component/subcomponent of the base station 105.

At block 1802, the method 1800 may include receiving, from a first UE, an interference report indicating sidelink communication interference. For example, the supplementary sidelink configuration component 146, the modem 144, the transceiver 302, the processor 312, and/or the memory 316 of the base station 105, and/or one or more additional components/subcomponents of the base station 105 may be configured to or may comprise means for receiving, from a first UE, an interference report indicating sidelink communication interference.

For example, the receiving the interference report at block 1802 may include receiving by the supplementary sidelink configuration component 146, the modem 144, the transceiver 302, the processor 312, and/or the memory 316 of the base station 105, via, for example, the antenna 365 and the RF front end 388, from the UE 110a of FIG. 9A, an interference report indicating sidelink communication interference based on interference from the sidelink communication 904 of FIG. 9A.

At block 1804, the method 1800 may include selecting a resource pool according to the interference report, the resource pool comprising at least one supplementary sidelink subchannel reserved for receiving sidelink communications and conditionally reserved for transmitting sidelink communications based on the interference report. For example, the supplementary sidelink configuration component 146, the modem 144, the transceiver 302, the processor 312, and/or the memory 316 of the base station 105, and/or one or more additional components/subcomponents of the base station 105 may be configured to or may comprise means for selecting a resource pool according to the interference report, the resource pool comprising at least one supplementary sidelink subchannel reserved for receiving sidelink communications and conditionally reserved for transmitting sidelink communications based on the interference report.

For example, the selecting a resource pool at block 1804 may include selecting, by the supplementary sidelink configuration component 146, the modem 144, the transceiver 302, the processor 312, and/or the memory 316 of the base station 105, the resource pool according to the interference report, the resource pool may include at least one supplementary sidelink subchannel 1020 of FIG. 10A reserved for receiving sidelink communications and conditionally reserved for transmitting sidelink communications based on the interference report.

At block 1806, the method 1800 may include transmitting, to the first UE or a second UE causing the sidelink communication interference, configuration information indicating the resource pool. For example, the supplementary sidelink configuration component 146, the modem 144, the transceiver 302, the processor 312, and/or the memory 316 of the base station 105, and/or one or more additional components/subcomponents of the base station 105 may be configured to or may comprise means for transmitting, to the first UE 110a of FIG. 9A or the second UE 110b of FIG. 9A causing the sidelink communication interference, configuration information indicating the resource pool.

Additional Implementations

An example method of wireless communication by a base station, comprising: receiving, from a first user equipment (UE), an interference report indicating sidelink communication interference; selecting a resource pool according to the interference report, the resource pool comprising at least one supplementary sidelink subchannel reserved for receiving sidelink communications and conditionally reserved for transmitting sidelink communications based on the interference report; and transmitting, to the first UE or a second UE causing the sidelink communication interference, configuration information indicating the resource pool.

The above-example method, wherein selecting the resource pool comprises: selecting a contiguous resource pool comprising the at least one supplementary sidelink subchannel; or selecting a non-contiguous resource pool comprising the at least one supplementary sidelink subchannel.

One or more of the above-example methods, wherein a quantity of resource blocks of the at least one supplementary sidelink subchannel matches a quantity of resource blocks of one or more regular sidelink subchannels; or wherein the quantity of resource blocks of the at least one supplementary sidelink subchannel is different from the quantity of resource blocks of the one or more regular sidelink subchannels.

One or more of the above-example methods, wherein selecting the resource pool comprises: configuring the resource pool based on a bandwidth of an uplink slot including a number of unallocated resource blocks, wherein the at least one supplementary sidelink subchannel includes the unallocated resource blocks appended to a sidelink subchannel in response to the number of unallocated resource blocks being less than a minimum subchannel threshold, and wherein the at least one supplementary sidelink subchannel includes the unallocated resource blocks in response to the number of unallocated resource blocks being greater than or equal to the minimum subchannel threshold.

One or more of the above-example methods, further comprising: identifying the second UE based on the interference report, wherein the configuration information is transmitted to the second UE in response to the second UE being identified.

One or more of the above-example methods, wherein the second UE is further identified based on zone identification information.

One or more of the above-example methods, further comprising: using one or more of synchronization signal block (SSB) indexing information, channel state information (CSI) reference signal beam sweeping information, pathloss information, timing advance information, or positioning information to adjust ambiguities in the zone identification information.

One or more of the above-example methods, further comprising: combining information from the interference report with information from an additional interference report from an additional first UE to form an interference map for a geographical area.

One or more of the above-example methods, further comprising: defining groups of zones in the geographical area based on the interference map; and scheduling transmissions on the at least one supplementary sidelink subchannel such that a single UE per zone group of the groups of zones is scheduled to use the at least one supplementary sidelink subchannel per slot.

One or more of the above-example methods, further comprising: activating or deactivating of transmissions on the at least one supplementary sidelink subchannel for the second UE based on the interference report.

One or more of the above-example methods, further comprising: indicating to the second UE a time for reactivation of the transmissions on the at least one supplementary sidelink subchannel for the second UE.

One or more of the above-example methods, further comprising: transmitting, to the second UE, an indication of the activating or the deactivating of the transmissions on the at least one supplementary sidelink subchannel for the second UE.

One or more of the above-example methods, wherein the indication is one or more of a zone based indication or a priority based indication.

One or more of the above-example methods, wherein the indication explicitly indicates one or more slots corresponding to the at least one supplementary sidelink subchannel for the activating or the deactivating or explicitly indicates a time duration for the activating or the deactivating.

One or more of the above-example methods, further comprising: determining the second UE is in an out-of-coverage area of the base station; and deactivating transmissions on the at least one supplementary sidelink subchannel for the second UE in response to the second UE being in the out-of-coverage area.

A second method of wireless communication by a user equipment (UE), comprising: receiving, from a base station, configuration information indicating a resource pool comprising at least one supplementary sidelink subchannel reserved for receiving sidelink communications and conditionally reserved for transmitting sidelink communications based on an interference report indicating sidelink communication interference; and communicating with one or more sidelink UEs according to the configuration information.

The above-example second method, wherein the resource pool further comprises: a contiguous resource pool including the at least one supplementary sidelink subchannel and one or more regular sidelink subchannels; or a non-contiguous resource pool including the at least one supplementary sidelink subchannel.

One or more of the above-example second methods, wherein a quantity of resource blocks of the at least one supplementary sidelink subchannel matches a quantity of resource blocks of the one or more regular sidelink subchannels; or wherein the quantity of resource blocks of the at least one supplementary sidelink subchannel is different from the quantity of resource blocks of the one or more regular sidelink sub channels.

One or more of the above-example second methods, wherein the resource pool is based on a bandwidth of an uplink slot including a number of unallocated resource blocks, and wherein the at least one supplementary sidelink subchannel includes the unallocated resource blocks appended to a sidelink subchannel in response to the number of unallocated resource blocks being less than a minimum subchannel threshold, and wherein the at least one supplementary sidelink subchannel includes the unallocated resource blocks in response to the number of unallocated resource blocks being greater than or equal to the minimum subchannel threshold.

One or more of the above-example second methods, further comprising: generating the interference report based on the sidelink communication interference; and transmitting, to the base station, the interference report.

One or more of the above-example second methods, further comprising: transmitting, to the base station, zone identification information to indicate a second UE causing the sidelink communication interference.

One or more of the above-example second methods, further comprising: using one or more of synchronization signal block (SSB) indexing information, channel state information (CSI) reference signal beam sweeping information, path-loss information, timing advance information, or positioning information to adjust ambiguities in the zone identification information.

One or more of the above-example second methods, further comprising: receiving, from the base station, scheduling information for scheduling transmissions on the at least one supplementary sidelink subchannel.

One or more of the above-example second methods, further comprising: receiving, from the base station, an indication of activating or deactivating the transmissions on the at least one supplementary sidelink subchannel.

One or more of the above-example second methods, wherein the indication is one or more of a zone based indication or a priority based indication.

One or more of the above-example second methods, wherein the indication explicitly indicates one or more slots corresponding to the at least one supplementary sidelink subchannel for the activating or the deactivating or explicitly indicates a time duration for the activating or the deactivating.

One or more of the above-example second methods, further comprising: transmitting, to one or more second UEs, a reservation request to request that no data be transmitted by the one or more UEs on the at least one supplementary sidelink subchannel.

One or more of the above-example second methods, further comprising: mapping sidelink feedback to resource blocks for full duplex slots based on one of resource blocks of the at least one supplementary sidelink subchannel being prevented from use for the sidelink feedback, guard bands of the resource blocks of the at least one supplementary sidelink subchannel being prevented from use for the sidelink feedback, or the resource blocks of the at least one supplementary sidelink subchannel being allowed for use for the sidelink feedback.

An example base station, comprising: a memory storing instructions; and one or more processors coupled with the memory and configured to: receive, from a first user equipment (UE), an interference report indicating sidelink communication interference; select a resource pool according to the interference report, the resource pool comprising at least one supplementary sidelink subchannel reserved for receiving sidelink communications and conditionally reserved for transmitting sidelink communications based on the interference report; and transmit, to the first UE or a second UE causing the sidelink communication interference, configuration information indicating the resource pool.

An example UE, comprising: a memory storing instructions; and one or more processors coupled with the memory and configured to: receive, from a base station, configuration information indicating a resource pool comprising at least one supplementary sidelink subchannel reserved for receiving sidelink communications and conditionally reserved for transmitting sidelink communications based on an interference report indicating sidelink communication interference; and communicate with one or more sidelink UEs according to the configuration information.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. For example, changes may be made in the function and arrangement of elements discussed without departing from the scope of the disclosure. Also, various examples may omit, substitute, or add various procedures or components as appropriate. For instance, the methods described may be performed in an order different from that described, and various steps may be added, omitted, or combined. Also, features described with respect to some examples may be combined in other examples. In some instances, well-known structures and apparatuses are shown in block diagram form in order to avoid obscuring the concepts of the described examples.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description herein, however, describes an LTE/LTE-A system or 5G system for purposes of example, and LTE terminology is used in much of the description below, although the techniques may be applicable other next generation communication systems.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A method of wireless communication by a base station, comprising:
   receiving, from a first user equipment (UE), an interference report indicating sidelink communication interference;
   selecting a resource pool according to the interference report, the resource pool comprising at least one supplementary sidelink subchannel reserved for receiving sidelink communications and conditionally reserved for transmitting sidelink communications based on the interference report; and
   transmitting, to the first UE or a second UE causing the sidelink communication interference, configuration information indicating the resource pool,
   wherein the at least one supplementary sidelink subchannel is in addition to at least one regular sidelink subchannel that experienced the interference, with the at least one supplementary sidelink subchannel and the at least one regular sidelink subchannel being preconfigured in the resource pool.

2. The method of claim 1, wherein selecting the resource pool comprises:
   selecting a contiguous resource pool comprising the at least one supplementary sidelink subchannel; or
   selecting a non-contiguous resource pool comprising the at least one supplementary sidelink subchannel.

3. The method of claim 2, wherein a quantity of resource blocks of the at least one supplementary sidelink subchannel matches a quantity of resource blocks of one or more regular sidelink subchannels; or
   wherein the quantity of resource blocks of the at least one supplementary sidelink subchannel is different from the quantity of resource blocks of the one or more regular sidelink subchannels.

4. The method of claim 1, wherein selecting the resource pool comprises:
   configuring the resource pool based on a bandwidth of an uplink slot including a number of unallocated resource blocks,
   wherein the at least one supplementary sidelink subchannel includes the unallocated resource blocks appended to a sidelink subchannel in response to the number of unallocated resource blocks being less than a minimum subchannel threshold, and wherein the at least one supplementary sidelink subchannel includes the unallocated resource blocks in response to the number of unallocated resource blocks being greater than or equal to the minimum subchannel threshold.

5. The method of claim 1, further comprising:
   identifying the second UE based on the interference report, wherein the configuration information is transmitted to the second UE in response to the second UE being identified.

6. The method of claim 5, wherein the second UE is further identified based on zone identification information.

7. The method of claim 6, further comprising:
   using one or more of synchronization signal block (SSB) indexing information, channel state information (CSI) reference signal beam sweeping information, path-loss information, timing advance information, or positioning information to adjust ambiguities in the zone identification information.

8. The method of claim 6, further comprising:
combining information from the interference report with information from an additional interference report from an additional first UE to form an interference map for a geographical area.

9. The method of claim 8, further comprising:
defining groups of zones in the geographical area based on the interference map; and
scheduling transmissions on the at least one supplementary sidelink subchannel such that a single UE per zone group of the groups of zones is scheduled to use the at least one supplementary sidelink subchannel per slot.

10. The method of claim 1, further comprising:
activating or deactivating of transmissions on the at least one supplementary sidelink subchannel for the second UE based on the interference report.

11. The method of claim 10, further comprising:
indicating to the second UE a time for reactivation of the transmissions on the at least one supplementary sidelink subchannel for the second UE.

12. The method of claim 10, further comprising:
transmitting, to the second UE, an indication of the activating or the deactivating of the transmissions on the at least one supplementary sidelink subchannel for the second UE.

13. The method of claim 12, wherein the indication is one or more of a zone based indication or a priority based indication.

14. The method of claim 12, wherein the indication explicitly indicates one or more slots corresponding to the at least one supplementary sidelink subchannel for the activating or the deactivating or explicitly indicates a time duration for the activating or the deactivating.

15. The method of claim 1, further comprising:
determining the second UE is in an out-of-coverage area of the base station; and
deactivating transmissions on the at least one supplementary sidelink subchannel for the second UE in response to the second UE being in the out-of-coverage area.

16. A method of wireless communication by a user equipment (UE), comprising:
receiving, from a base station, configuration information indicating a resource pool comprising at least one supplementary sidelink subchannel reserved for receiving sidelink communications and conditionally reserved for transmitting sidelink communications based on an interference report indicating sidelink communication interference; and
communicating with one or more sidelink UEs according to the configuration information,
wherein the at least one supplementary sidelink subchannel is in addition to at least one regular sidelink subchannel that experienced the interference, with the at least one supplementary sidelink subchannel and the at least one regular sidelink subchannel being preconfigured in the resource pool.

17. The method of claim 16, wherein the resource pool further comprises:
a contiguous resource pool including the at least one supplementary sidelink subchannel and one or more regular sidelink subchannels; or
a non-contiguous resource pool including the at least one supplementary sidelink subchannel.

18. The method of claim 17, wherein a quantity of resource blocks of the at least one supplementary sidelink subchannel matches a quantity of resource blocks of the one or more regular sidelink subchannels; or wherein the quantity of resource blocks of the at least one supplementary sidelink subchannel is different from the quantity of resource blocks of the one or more regular sidelink subchannels.

19. The method of claim 16, wherein the resource pool is based on a bandwidth of an uplink slot including a number of unallocated resource blocks, and
wherein the at least one supplementary sidelink subchannel includes the unallocated resource blocks appended to a sidelink subchannel in response to the number of unallocated resource blocks being less than a minimum subchannel threshold, and
wherein the at least one supplementary sidelink subchannel includes the unallocated resource blocks in response to the number of unallocated resource blocks being greater than or equal to the minimum subchannel threshold.

20. The method of claim 16, further comprising:
generating the interference report based on the sidelink communication interference; and
transmitting, to the base station, the interference report.

21. The method of claim 16, further comprising:
transmitting, to the base station, zone identification information to indicate a second UE causing the sidelink communication interference.

22. The method of claim 21, further comprising:
using one or more of synchronization signal block (SSB) indexing information, channel state information (CSI) reference signal beam sweeping information, path-loss information, timing advance information, or positioning information to adjust ambiguities in the zone identification information.

23. The method of claim 21, further comprising:
receiving, from the base station, scheduling information for scheduling transmissions on the at least one supplementary sidelink subchannel.

24. The method of claim 23, further comprising:
receiving, from the base station, an indication of activating or deactivating the transmissions on the at least one supplementary sidelink subchannel.

25. The method of claim 24, wherein the indication is one or more of a zone based indication or a priority based indication.

26. The method of claim 24, wherein the indication explicitly indicates one or more slots corresponding to the at least one supplementary sidelink subchannel for the activating or the deactivating or explicitly indicates a time duration for the activating or the deactivating.

27. The method of claim 16, further comprising:
transmitting, to one or more second UEs, a reservation request to request that no data be transmitted by the one or more UEs on the at least one supplementary sidelink subchannel.

28. The method of claim 16, further comprising:
mapping sidelink feedback to resource blocks for full duplex slots based on one of resource blocks of the at least one supplementary sidelink subchannel being prevented from use for the sidelink feedback, guard bands of the resource blocks of the at least one supplementary sidelink subchannel being prevented from use for the sidelink feedback, or the resource blocks of the at least one supplementary sidelink subchannel being allowed for use for the sidelink feedback.

29. A base station, comprising:
a memory storing instructions; and
one or more processors coupled with the memory and configured to:
- receive, from a first user equipment (UE), an interference report indicating sidelink communication interference;
- select a resource pool according to the interference report, the resource pool comprising at least one supplementary sidelink subchannel reserved for receiving sidelink communications and conditionally reserved for transmitting sidelink communications based on the interference report; and
- transmit, to the first UE or a second UE causing the sidelink communication interference, configuration information indicating the resource pool,
- wherein the at least one supplementary sidelink subchannel is in addition to at least one regular sidelink subchannel that experienced the interference, with the at least one supplementary sidelink subchannel and the at least one regular sidelink subchannel being preconfigured in the resource pool.

30. A user equipment (UE), comprising:
a memory storing instructions; and
one or more processors coupled with the memory and configured to:
- receive, from a base station, configuration information indicating a resource pool comprising at least one supplementary sidelink subchannel reserved for receiving sidelink communications and conditionally reserved for transmitting sidelink communications based on an interference report indicating sidelink communication interference; and
- communicate with one or more sidelink UEs according to the configuration information,
- wherein the at least one supplementary sidelink subchannel is in addition to at least one regular sidelink subchannel that experienced the interference, with the at least one supplementary sidelink subchannel and the at least one regular sidelink subchannel being preconfigured in the resource pool.

* * * * *